US012652498B1

(12) United States Patent
Hogue et al.

(10) Patent No.: US 12,652,498 B1
(45) Date of Patent: Jun. 9, 2026

(54) LOUDSPEAKER PERFORMANCE UTILIZING COUPLED LOUDSPEAKER MOTORS

(71) Applicant: Amazon Technologies, Inc., Seattle, WA (US)

(72) Inventors: Douglas K. Hogue, Bothell, WA (US); William Ryan, Issaquah, WA (US); Temilade Adetoro Adeyemo, State College, PA (US); Wing Kit Ho, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 166 days.

(21) Appl. No.: 18/758,796

(22) Filed: Jun. 28, 2024

(51) Int. Cl.

| | |
|---|---|
| ***H04R 9/06*** | (2006.01) |
| ***H04R 1/02*** | (2006.01) |
| ***H04R 9/02*** | (2006.01) |
| ***H04R 9/04*** | (2006.01) |

(52) U.S. Cl.
CPC ............ *H04R 9/063* (2013.01); *H04R 1/025* (2013.01); *H04R 9/025* (2013.01); *H04R 9/046* (2013.01)

(58) Field of Classification Search
CPC ........ H04R 9/025; H04R 1/025; H04R 9/063; H04R 2209/022; H04R 9/046; H04R 9/06; H04R 9/04
See application file for complete search history.

(56) References Cited

U.S. PATENT DOCUMENTS

2024/0089666 A1* 3/2024 Lee ........................ H04R 9/063

FOREIGN PATENT DOCUMENTS

CN 114449421 A * 5/2022 ............... H04R 1/24

* cited by examiner

*Primary Examiner* — Kile O Blair
(74) *Attorney, Agent, or Firm* — K&L Gates LLP

(57) ABSTRACT

Systems, apparatuses, methods, and techniques are described for providing improved loudspeaker performance by utilizing coupled loudspeaker motors. According to an example method, a first baseplate of a first loudspeaker motor is coupled to a second baseplate of a second loudspeaker motor such that the first loudspeaker motor and the second loudspeaker motor are oriented in opposing directions. The example method further includes repelling, based on a first magnetic polarity of the first baseplate, a first magnetic flux leakage associated with the second baseplate of the second loudspeaker motor such that the first magnetic flux leakage is redirected towards the second loudspeaker motor. The example method further includes repelling, based on a second magnetic polarity of the second baseplate, a second magnetic flux leakage associated with the first baseplate of the first loudspeaker motor such that the second magnetic flux leakage is redirected towards the first loudspeaker motor.

20 Claims, 8 Drawing Sheets
(2 of 8 Drawing Sheet(s) Filed in Color)

LOUDSPEAKER PERFORMANCE UTILIZING COUPLED LOUDSPEAKER MOTORS

BACKGROUND

A conventional loudspeaker comprises a magnetic circuit that functions as an electric motor that is used to drive various components of the loudspeaker in order to generate sound pressure waves based on electrical signals supplied to the magnet circuit. However, conventional systems and techniques for utilizing traditional loudspeakers exhibit numerous drawbacks, inefficiencies, and limitations.

BRIEF DESCRIPTION OF DRAWINGS

Reference will now be made to the accompanying drawings, which are not necessarily drawn to scale. Some embodiments may include fewer or more components than those shown in the figures. The patent or application file contains at least one drawing executed in color. Copies of this patent or patent application publication with color drawing(s) will be provided by the Office upon request and payment of the necessary fee.

DETAILED DESCRIPTION

Figure 1:
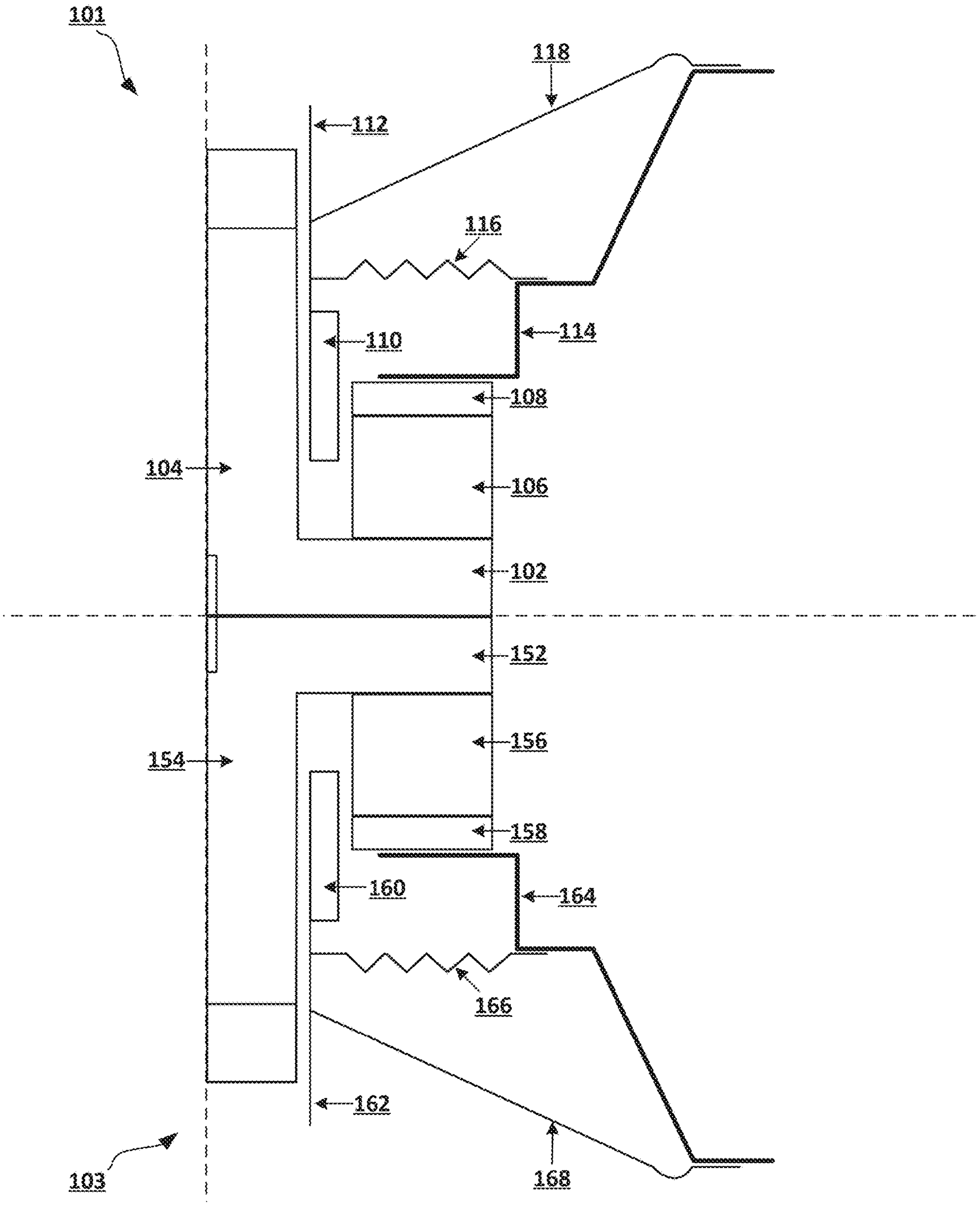
FIG. 1 illustrates an axisymmetric view of two example loudspeakers coupled together in accordance with various aspects of the present disclosure.

In the following description, reference is made to the accompanying drawings which illustrate several examples for the present disclosure. It is understood that other embodiments may be utilized and that mechanical, compositional, structural, and/or electrical operational changes may be made without departing from the spirit and scope of the present disclosure. The following detailed description is not to be taken in a limiting sense, and the scope of the embodiments of the present invention is defined only by the claims of the issued patent.

A conventional loudspeaker comprises a magnetic circuit (aka. a loudspeaker motor) that functions as an electric motor that is used to drive various components of the loudspeaker in order to generate sound pressure waves based on electrical signals supplied to the magnet circuit. However, conventional loudspeakers constructed with conventional magnetic circuits are subject to many inefficiencies and performance losses, e.g. performance losses caused by leakage from the magnetic circuit. For example, a conventional magnetic circuit is subject to magnetic flux leakage in which portions of the magnetic flux-a measurement of a respective magnetic field passing through a given area of an object (e.g., such as a loudspeaker motor)-associated with the magnetic circuit do not follow a desired or intended path through the magnetic circuit of a loudspeaker.

In the context of loudspeakers, magnetic flux leakage can lead to a number of inefficiencies and performance limitations. The magnetic flux passing through a loudspeaker motor is generated in part by an electrical signal provided to a voice coil of the loudspeaker motor, and magnetic flux leakage can be understood as wasted potential energy that leads to the inefficient performance of the loudspeaker motor. Therefore, magnetic flux leakage in a loudspeaker motor can cause degradations in the strength (aka. the force factor) of the loudspeaker motor. Such degradations in the strength of a loudspeaker motor may directly impact the sensitivity and/or efficiency of a loudspeaker comprising said loudspeaker motor, referred to as the sound pressure level (SPL) of the loudspeaker. The SPL of a loudspeaker directly correlates to the volume output of the loudspeaker such that limitations in the strength of a corresponding loudspeaker motor (e.g., as caused by magnetic flux leakage) directly limit the maximum acoustic output of the loudspeaker.

To solve these and other technical challenges, the present disclosure sets forth systems, methods, and apparatuses that provide improved loudspeaker performance utilizing coupled loudspeaker motors. In example embodiments, two loudspeaker motors of two respective loudspeakers may be coupled by their respective baseplates such that the cones of the two loudspeakers that are used to generate sound pressure waves are oriented in opposing (e.g., opposite, or near-opposite) directions. In this regard, the respective baseplates of two loudspeaker motors may be coupled at a coupling area (e.g., an area associated with the bottoms surfaces of the respective loudspeaker motors) by one or more coupling means. For example, in some embodiments, the respective baseplates of the two loudspeaker motors may be coupled by a locating pin. In such embodiments, a first portion of the locating pin may be inserted into the first baseplate of the first loudspeaker motor at a center point of a first outer diameter of a first centrally located pole piece of the first loudspeaker motor, and a second portion of the locating pin may be inserted into the second baseplate of the second loudspeaker motor at a center point of a second outer diameter of a second centrally located pole piece of the second loudspeaker motor such that a first central axis of the first loudspeaker motor aligns with a second central axis of the second loudspeaker motor.

In various examples, a first magnet of a first loudspeaker motor is oriented such that a first baseplate of the first loudspeaker motor has a first polarity (e.g., associated with a south pole of the first magnet) associated with the first magnet, and a second magnet of the second loudspeaker motor is oriented such that a second baseplate of the second loudspeaker motor has a second polarity associated with the second magnet, where the first polarity is a same polarity as the second polarity (e.g., the first polarity and the second polarity are associated with the south pole of the first magnet and the south pole of the second magnet respectively). As such, the first polarity of the first baseplate of the first loudspeaker motor may repel a first magnetic flux leakage associated with the second baseplate of the second loudspeaker motor during operation of the second loudspeaker motor such that the first magnetic flux leakage is redirected towards the second loudspeaker motor. Additionally, the second polarity of the second baseplate of the second loudspeaker motor may repel a second magnetic flux leakage associated with the first baseplate of the first loudspeaker motor during operation of the first loudspeaker motor such that the second magnetic flux leakage is redirected towards the first loudspeaker motor.

Accordingly, example embodiments described herein are configured to harness and redirect the magnetic flux leakage associated with respective loudspeaker motors to, among other benefits, increase the efficiency, the motor strength (e.g., the force factor of the loudspeaker motors), and the SPL of the respective loudspeakers. This also provides the benefit of reducing the consumption of raw materials. Because harnessing and redirecting the magnetic flux leakage associated with respective loudspeaker motors increases the performance of the two respective loudspeakers, smaller loudspeakers may be used to satisfy the same requirements (e.g., acoustic output requirements of a respective product and/or electronic device). As such, raw materials such as the copper wire used in the voice coils of the respective loudspeaker motors can be reduced, leading to lower resource consumption and lower manufacturing costs while providing increased loudspeaker performance. Furthermore, because the size of the respective loudspeakers may be reduced due to the use of fewer materials, the respective form factor (e.g., size, dimensions) of an electronic device integrated with the coupled loudspeakers of example embodiments may also be reduced.

Additionally, harnessing and redirecting the magnetic flux leakage associated with respective loudspeaker motors increases the magnetic flux density in the respective loudspeaker motors, thereby increasing the magnetic "saturation" of the ferrous components associated with the respective loudspeaker motors. Increasing the magnetic saturation of the ferrous components associated with the respective loudspeaker motors causes a reduction in the inductance of the respective voice coils of the loudspeaker motors, which leads to higher frequency response and increased performance of the voice coil. As such, the respective loudspeakers are optimized to produce sound waves in a wider range of frequencies and at a stronger intensity. Furthermore, increasing the magnetic saturation of the respective loudspeaker motors leads to less output variation (e.g., audio signal output variation) which may be caused in part by the physical variations in the manufactured components of the respective loudspeakers. As such, the higher magnetic saturation provided to the respective loudspeaker motors may be leveraged to overcome variations in the manufactured components of the loudspeaker motors such that example embodiments provide tighter tolerances (e.g., acceptable range of component variation) when mass-producing an electronic device (e.g., a digital assistant, a multimedia device, a portable audio device, smart home device, and/or the like).

Moreover, it should be appreciated that example embodiments as set forth herein solve particular technical problems, such as the vibration of an electronic device due to the moving mass (e.g., force) of loudspeaker components used in conventional electronics designs. For example, when a single loudspeaker is utilized for a particular electronic device, the inertial force caused by moving mass of the voice coil (e.g., the weight of the copper wire wrapped around a respective voice coil former) may cause an electronic device to vibrate and/or "walk" across a surface (e.g., move across a table, countertop, and/or the like) if the particular electronic device is not coupled to the surface. By coupling the loudspeakers, the inertial moving masses of each loudspeaker (e.g., caused by the moving components of the loudspeakers, also known as "speaker excursion") will be "out of phase" such that the vibrations of the respective loudspeakers cancel each other out and thereby prevent unintentional loudspeaker movement and/or electronic device movement resulting from the speaker excursion of the respective loudspeakers.

It will be appreciated that the scope of the present disclosure encompasses many potential example embodiments in addition to those described above, some of which will be described in further detail below. Now that some advantages associated with example implementations described herein have been described above in contrast with traditional systems, examples of the architecture and componentry of example embodiments will now be described below with reference to FIGS. 1-8.

FIG. 1 illustrates an axisymmetric view of two example loudspeakers (e.g., loudspeaker 101 and loudspeaker 103) coupled together in accordance with various aspects of the present disclosure. As shown, the first loudspeaker (e.g., loudspeaker 101) comprises a loudspeaker motor (e.g., a magnetic circuit) comprising a baseplate 102, a centrally located pole piece 104, a magnet 106, a top plate 108, a voice coil 110, and/or a voice coil former 112. The centrally located pole piece 104 protrudes from the baseplate 102 from a top surface of the baseplate 102 at a right angle to the top surface of the baseplate 102. In various conventional designs, the magnet 106 is a ring-shaped magnet and is coupled to the top surface of the baseplate 102. The top plate 108 of the loudspeaker may also be ring shaped and, in various examples, may match the shape of the magnet 106.

The loudspeaker motor of the first loudspeaker (e.g., loudspeaker 101) further comprises the voice coil 110 which may be composed of a conductive wire (e.g., a wire made of copper, aluminum, and/or the like) that is configured to be tightly wound to the voice coil former 112. Electrical signals (e.g., alternating current (AC) signals) may be supplied to the voice coil 110, thus creating a magnetic field such that the voice coil 110 becomes an electromagnet. Such a magnetic field may interact with the magnet 106 to generate a directional force when the electromagnetic voice coil 110 repels or attracts the magnet 106, which in turn causes the voice coil former 112 to vibrate back and forth according the positive or negative phase of the electrical signals (e.g., the AC signals). This movement of the voice coil former 112 is transferred to the loudspeaker cone 118 which vibrates and pushes sound pressure waves into the air such that the electrical signals are transduced into sound pressure waves that can be perceived as sound by the human car.

In this regard, the first loudspeaker (e.g., loudspeaker 101) comprises structural components configured to facilitate the transduction of electrical signals (e.g., AC signals) supplied to the voice coil 110 into sound pressure waves such as a loudspeaker cone chassis 114, a suspension membrane 116, and/or a loudspeaker cone 118. As shown, the loudspeaker cone chassis 114 is coupled to the top plate 108 and is configured to support both the suspension membrane 116 and the loudspeaker cone 118 and may be constructed from various rigid materials (e.g., steel, aluminum alloy, plastic, and/or the like). The suspension membrane 116 may be a stiff yet flexible membrane (e.g., treated fabric, composite material, and/or the like) configured to ensure the voice coil former 112 is centered around and suspended over the centrally located pole piece 104. The suspension membrane 116 further ensures that voice coil former 112 and the loudspeaker cone 118 return to a neutral position during operation. The loudspeaker cone 118 may be a rigid or semi-rigid material (e.g., treated paper, plastic, metal, composite, and/or the like) and is the physical component that pushes and retracts the air surrounding the first loudspeaker (e.g., loudspeaker 101) to create sound pressure waves based on the electrical signals provided to the voice coil 110.

As shown in FIG. 1, the second loudspeaker (e.g., loudspeaker 103) may comprise the same or similar components configured to function in the same or similar manner as the components associated with the first loudspeaker (e.g., loudspeaker 101). For example, the second loudspeaker (e.g., loudspeaker 103) comprises a loudspeaker motor (e.g., a magnetic circuit) comprising a baseplate 152, a centrally located pole piece 154, a magnet 156, a top plate 158, a voice coil 160, and/or a voice coil former 162. The second loudspeaker (e.g., loudspeaker 103) may further comprise structural components configured to facilitate the transduction of electrical signals (e.g., AC signals) supplied to the voice coil 160 into sound pressure waves such as a loudspeaker cone chassis 164, a suspension membrane 166, and/or a loudspeaker cone 168.

As depicted in FIG. 1, in various examples, the first loudspeaker (e.g., loudspeaker 101) and the second loudspeaker (e.g., loudspeaker 103) may be coupled (e.g., connected, joined, attached, adhered, fastened) by their respective baseplates (e.g., baseplate 102 and baseplate 152). Further detail related to the coupling of two example loudspeaker will be described in greater detail below with reference to FIGS. 2-8. As a result of coupling the loudspeakers, the loudspeaker motors and structural components (e.g., loudspeaker chassis, suspension membranes, and loudspeaker cones) associated with the first loudspeaker and the second loudspeaker may be oriented in opposing (e.g., opposite, or near-opposite) directions. Furthermore, the relative magnetic polarities associated with the loudspeaker motor of the first loudspeaker (e.g., loudspeaker 101) and the loudspeaker motor of the second loudspeaker (e.g., loudspeaker 103) may interact with one another (e.g., repel against one another) such that any magnetic flux leakage associated with the respective loudspeaker motors is redirected back towards the respective loudspeaker motors.

As described herein, redirecting magnetic flux leakage back towards the loudspeaker motors, and therefore back to the intended paths of the corresponding magnetic circuits of the loudspeaker motors, increases the efficiency, the performance, and the strength of each respective loudspeaker motor. Further detail related to technical benefits provided by the mitigation and utilization of magnetic flux leakage associated with two loudspeakers coupled based on the methods described herein will be described in greater detail below with reference to FIGS. 2-8.

Figure 2:
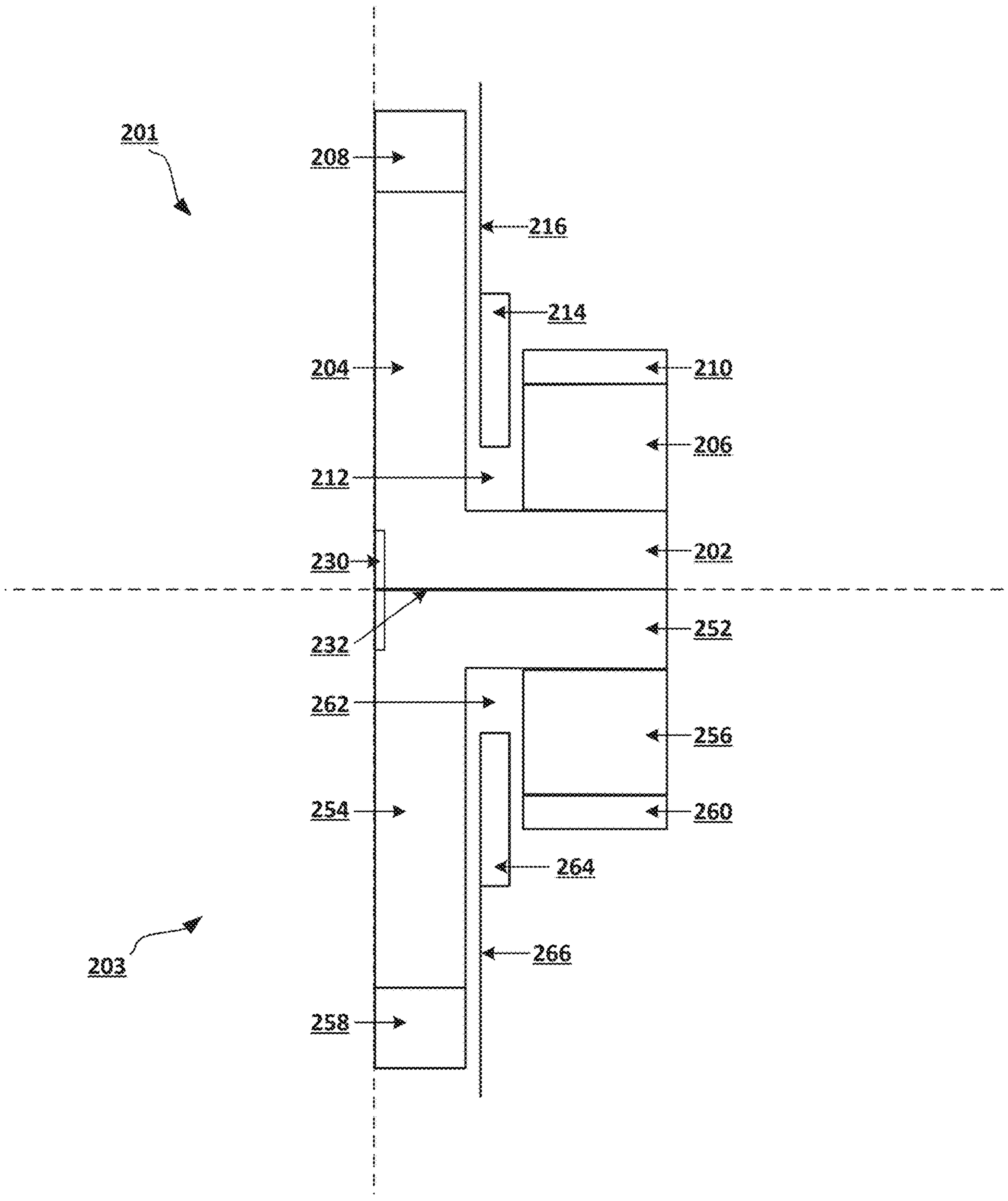
FIG. 2 illustrates an axisymmetric view of two example loudspeaker motors coupled together in accordance with various aspects of the present disclosure.

FIG. 2 illustrates an axisymmetric view of two example loudspeaker motors coupled together in accordance with various aspects of the present disclosure. As shown, in some embodiments, a first loudspeaker motor (e.g., loudspeaker motor 201) of a first loudspeaker may be coupled to a second loudspeaker motor (e.g., loudspeaker motor 203) of a second loudspeaker at a coupling area (e.g., coupling area 232). In some embodiments, the first loudspeaker motor (e.g., loudspeaker motor 201) comprises a first baseplate (e.g., baseplate 202), where the first baseplate (e.g., baseplate 202) comprises a first centrally located pole piece (e.g., centrally located pole piece 204). As depicted, in various example embodiments, the first centrally located pole piece (e.g., centrally located pole piece 204) protrudes from a top surface of the first baseplate (e.g., baseplate 202) at a right angle to the top surface of the first baseplate (e.g., baseplate 202).

The first loudspeaker motor (e.g., loudspeaker motor 201) further comprises a first magnet (e.g., magnet 206). In some embodiments, the first magnet (e.g., magnet 206) may be a ring-shaped magnet and a bottom surface of the first magnet (e.g., magnet 206) may be coupled to the top surface of the first baseplate (e.g., baseplate 202). In various embodiments, the first loudspeaker (e.g., loudspeaker motor 201) may comprise a second magnet (e.g., magnet 208). In some examples, the second magnet (e.g., magnet 208) may be a cylindrically shaped magnet and may be coupled to a distal end of the first centrally located pole piece (e.g., centrally located pole piece 204).

The first loudspeaker motor (e.g., loudspeaker motor 201) further comprises a first top plate (e.g., top plate 210), where a bottom surface of the first top plate (e.g., top plate 210) may be coupled to a top surface of the first magnet (e.g., magnet 206). As depicted, in some examples, a first clearance (e.g., clearance 212) may be formed between a first outer surface of the first centrally located pole piece (e.g., centrally located pole piece 204) of the first baseplate (e.g., baseplate 202), a first inner surface of the first magnet (e.g., magnet 206), and a second inner surface of the first top plate (e.g., top plate 210). The first loudspeaker motor (e.g., loudspeaker motor 201) may further comprise a first voice coil (e.g., voice coil 214), where the first voice coil (e.g., voice coil 214) may be comprised of a first conductive wire (e.g., wire composed of copper, aluminum, and/or the like) configured to receive one or more electrical signals. The first loudspeaker motor (e.g., loudspeaker motor 201) may also comprise a first voice coil former (e.g., voice coil former 216), where the first voice coil former (e.g., voice coil former 216) may be configured to be suspended over the first centrally located pole piece (e.g., centrally located pole piece 204) and within the first clearance (e.g., clearance 212).

As shown in FIG. 2, in some embodiments, the second loudspeaker motor (e.g., loudspeaker motor 203) comprises a second baseplate (e.g., baseplate 252), where the second baseplate (e.g., baseplate 252) comprises a second centrally located pole piece (e.g., centrally located pole piece 254). As depicted, in various example embodiments, the second centrally located pole piece (e.g., centrally located pole piece 254) protrudes from a top surface of the second baseplate (e.g., baseplate 252) at a right angle to the top surface of the second baseplate (e.g., baseplate 252).

The second loudspeaker motor (e.g., loudspeaker motor 203) further comprises a third magnet (e.g., magnet 256). In some embodiments, the third magnet may be a ring-shaped magnet and a bottom surface of the third magnet (e.g., magnet 256) may be coupled to the top surface of the second baseplate (e.g., baseplate 252). In various embodiments, the second loudspeaker (e.g., loudspeaker motor 201) may comprise a fourth magnet (e.g., magnet 258). In some examples, the fourth magnet (e.g., magnet 258) may be a cylindrically shaped magnet and may be coupled to a distal end of the second centrally located pole piece (e.g., centrally located pole piece 254).

The second loudspeaker motor (e.g., loudspeaker motor 203) further comprises a second top plate (e.g., top plate 260), where a bottom surface of the second top plate (e.g., top plate 260) may be coupled to a top surface of the third magnet (e.g., magnet 256). As depicted, in some examples, a second clearance (e.g., clearance 262) may be formed between a second outer surface of the second centrally located pole piece (e.g., centrally located pole piece 254) of the second baseplate (e.g., baseplate 252), a third inner surface of the third magnet (e.g., magnet 256), and a fourth inner surface of the second top plate (e.g., top plate 260). The second loudspeaker motor (e.g., loudspeaker motor 203) may further comprise a second voice coil (e.g., voice coil 264), where the second voice coil (e.g., voice coil 264) may be comprised of a second conductive wire configured to receive one or more electrical signals. The second loudspeaker motor (e.g., loudspeaker motor 203) also comprises a second voice coil former (e.g., voice coil former 266), where the second voice coil former (e.g., voice coil former 266) may be configured to be suspended over the second centrally located pole piece (e.g., centrally located pole piece 254) and within the second clearance (e.g., clearance 226).

As depicted, the first loudspeaker motor (e.g., loudspeaker motor 201) and the second loudspeaker motor (e.g., loudspeaker motor 203) may be coupled (e.g., connected, joined, attached, adhered, fastened) at a coupling area (e.g., coupling area 232). In various examples, the coupling area (e.g., coupling area 232) is associated with the respective bottom surfaces of the first baseplate (e.g., baseplate 202) of the first loudspeaker motor (e.g., loudspeaker motor 201) and the second baseplate (e.g., baseplate 252) of the second loudspeaker motor (e.g., loudspeaker motor 203). In various examples, the first loudspeaker motor (e.g., loudspeaker motor 201) and the second loudspeaker motor (e.g., loudspeaker motor 203) may be coupled (e.g., connected, joined, attached, adhered, fastened) at the coupling area (e.g., coupling area 232) via one or more methods.

For example, the first loudspeaker motor (e.g., loudspeaker motor 201) and the second loudspeaker motor (e.g., loudspeaker motor 203) may be coupled at the coupling area (e.g., coupling area 232) by a locating pin (e.g., locating pin 230). The locating pin (e.g., locating pin 230) may be constructed of a rigid material (e.g., metal, plastic, composite, and/or the like) and inserted into the first baseplate (e.g., baseplate 202) of the first loudspeaker motor (e.g., loudspeaker motor 201) and the second baseplate (e.g., baseplate 252) of the second loudspeaker motor (e.g., loudspeaker motor 203) respectively. Additionally or alternatively, the locating pin (e.g., locating pin 230) may be constructed from magnetic (e.g., ferrous) or non-magnetic (e.g., non-ferrous) materials. In some examples, the locating pin (e.g., locating pin 230) may comprise a solid core and may configured in a solid dowel shape.

Alternatively, in various examples, the locating pin (e.g., locating pin 230) may be configured as a coiled spring pin (aka. spiral pin), where the locating pin is configured to roll and/or coil around itself such that the diameter of the locating pin is changed (e.g., reduced) as the locating pin is inserted into a mating hole (e.g., a hole associated with the first baseplate (e.g., baseplate 202) and/or the second baseplate (e.g., baseplate 252)). Alternatively, in some examples, the locating pin (e.g., locating pin 230) may be configured as a slotted spring pin, where the locating pin is configured to be compressed such that the diameter of the locating pin is changed (e.g., reduced) as the locating pin is inserted into a mating hole (e.g., a hole associated with the first baseplate (e.g., baseplate 202) and/or the second baseplate (e.g., baseplate 252)).

Locating pins configured as a coiled spring pin or a slotted spring pin that are utilized to couple two loudspeaker motors as described herein may exert an outward pressure on the walls of the respective mating holes associated with the first baseplate (e.g., baseplate 202) and the second baseplate (e.g., baseplate 252). Such outward pressure is a result of the spring-like elastic force of the locating pin which returns the locating pin to its natural, "resting," state. When inserted into the respective mating holes of the first baseplate (e.g., baseplate 202) and the second baseplate (e.g., baseplate 252), the outward pressure of the locating pin may provide friction between the outer surface of the locating pin and the inner wall of the respective mating holes that can be utilized to hold the first loudspeaker motor (e.g., loudspeaker motor 201) and the second loudspeaker motor (e.g., loudspeaker motor 203) together to maintain the coupled configuration depicted in FIG. 2.

In various examples, a first portion of the locating pin (e.g., locating pin 230) is inserted into the first baseplate (e.g., baseplate 202) of the first loudspeaker motor (e.g., loudspeaker motor 201) at a center point of a first outer diameter of a first centrally located pole piece (e.g., centrally located pole piece 204) of the first loudspeaker motor and a second portion of the locating pin is inserted into the second baseplate (e.g., baseplate 252) of the second loudspeaker motor (e.g., loudspeaker motor 201) at a center point of a second outer diameter of a second centrally located pole piece (e.g., centrally located pole piece 254) of the second loudspeaker motor such that a first central axis of the first loudspeaker motor aligns with a second central axis of the second loudspeaker motor. In various examples, the first portion of the locating pin (e.g., locating pin 230) may be longer or shorter than the second portion of the locating pin.

In some examples, a locating pin (e.g., locating pin 230) may be "force fit" into the respective baseplates of the first loudspeaker motor (e.g., loudspeaker motor 201) and the second loudspeaker motor (e.g., loudspeaker motor 203) such that the two loudspeaker motors are coupled together based on the friction created by the force fitting of the locating pin into the respective baseplates (e.g., baseplate 202 and baseplate 252). Additionally or alternatively, the locating pin (e.g., locating pin 230) that couples the first loudspeaker motor (e.g., loudspeaker motor 201) and the second loudspeaker motor (e.g., loudspeaker motor 203) together may be adhered to the respective loudspeaker motors via an adhesive (e.g., glue, epoxy, resin, and/or the like). Additionally or alternatively, the locating pin (e.g., locating pin 230) may couple the first loudspeaker motor (e.g., loudspeaker motor 201) and the second loudspeaker motor (e.g., loudspeaker motor 203) together utilizing a combination of force fitting and an adhesive.

Additionally or alternatively, in various examples, an adhesive (e.g., glue, epoxy, resin, and/or the like) may be applied to coupling area (e.g., coupling area 232) such that the respective bottom surfaces of the first baseplate (e.g., baseplate 202) of the first loudspeaker motor (e.g., loudspeaker motor 201) and the second baseplate (e.g., baseplate 252) of the second loudspeaker motor (e.g., loudspeaker motor 203) are coupled together via the adhesive. In some examples, the first loudspeaker motor (e.g., loudspeaker motor 201) and the second loudspeaker motor (e.g., loudspeaker motor 203) may be coupled together by both a locating pin (e.g., locating pin 230) and an adhesive applied to the coupling area (e.g., coupling area 232).

Additionally or alternatively, in some embodiments, the first loudspeaker motor (e.g., loudspeaker motor 201) and the second loudspeaker motor (e.g., loudspeaker motor 203) may be coupled together by a structural housing of an electronic device (e.g., a digital assistant, a multimedia device, a portable audio device, smart home device, and/or the like) encompassing the a first loudspeaker comprising the first loudspeaker motor (e.g., loudspeaker motor 201) and a second loudspeaker comprising the second loudspeaker motor (e.g., loudspeaker motor 203). As such, the inner support structure of the electronic device may be configured such that the first loudspeaker motor (e.g., loudspeaker motor 201) and the second loudspeaker motor (e.g., loudspeaker motor 203) are held in place such that the first baseplate (e.g., baseplate 202) and the second baseplate (e.g., baseplate 252) are coupled together at the coupling area (e.g., coupling area 232). Additionally or alternatively, in various examples, the first loudspeaker motor (e.g., loudspeaker motor 201) and the second loudspeaker motor (e.g., loudspeaker motor 203) may be coupled together at the coupling area (e.g., coupling area 232) by two or more of a locating pin (e.g., locating pin 230), an adhesive, and/or a structural housing of an electronic device.

Alternatively, in various examples, the first baseplate (e.g., baseplate 202) of the first loudspeaker motor (e.g., loudspeaker motor 201) and the second baseplate (e.g., baseplate 252) of the second loudspeaker motor (e.g., loudspeaker motor 203) are a common baseplate. In such examples, the common baseplate may be a single structure configured to support the various components of a first loudspeaker and a second loudspeaker (e.g., loudspeaker motor components, loudspeaker structural components, and/or the like).

In this regard, by coupling the first loudspeaker motor (e.g., loudspeaker motor 201) and the second loudspeaker motor (e.g., loudspeaker motor 203) by their respective baseplate (e.g., baseplate 202 and baseplate 252), the loudspeakers and corresponding structural components (e.g., loudspeaker chassis, suspension membranes, and loudspeaker cones) associated with the first loudspeaker and the second loudspeaker may be oriented in opposing (e.g., opposite, or near-opposite) directions. As such, any sound pressure waves that originate from the first loudspeaker comprising the first loudspeaker motor (e.g., loudspeaker motor 201) and the second loudspeaker comprising the second loudspeaker motor (e.g., loudspeaker motor 203) may be originated and/or transmitted in opposing (e.g., opposite, or near-opposite) directions. Furthermore, when the first loudspeaker motor (e.g., loudspeaker motor 201) and the second loudspeaker motor (e.g., loudspeaker motor 203) are provided the same electronic signals (e.g., the same AC signals are provided to both the first voice coil (e.g., voice coil 214) and the second voice coil (e.g., voice coil 264), the inertial moving masses of each respective loudspeaker (e.g., caused by the moving components of the respective loudspeakers such as voice coils, voice coil formers, suspension membranes, loudspeaker cones, and/or the like) will be out of phase. As such, the vibrations of the respective loudspeakers may cancel each other out and thereby prevent unintentional loudspeaker movement and/or electronic device movement resulting from the inertial moving masses of the respective loudspeakers.

In various examples, the first magnet (e.g., magnet 206) may be oriented such that the first baseplate (e.g., baseplate 202) has a first polarity associated with the first magnet (e.g., a polarity associated with a south pole of the magnet 206). Additionally, the third magnet (e.g., magnet 256) may be oriented such that the second baseplate (e.g., baseplate 252) has a second polarity associated with the third magnet (e.g., a polarity associated with a south pole of the magnet 256), where the first polarity may be a same polarity as the second polarity (e.g., the first and second polarity are associated with the south pole of the first and second magnets respectively).

As such, the first polarity of the first baseplate (e.g., baseplate 202) of the first loudspeaker motor (e.g., loudspeaker motor 201) may repel a first magnetic flux leakage associated with the second baseplate (e.g., baseplate 252) of the second loudspeaker motor (e.g., loudspeaker motor 203) during operation of the second loudspeaker motor such that the first magnetic flux leakage is redirected towards the second loudspeaker motor. Additionally, the second polarity of the second baseplate (e.g., baseplate 252) of the second loudspeaker motor (e.g., loudspeaker motor 203) may repel a second magnetic flux leakage associated with the first baseplate (e.g., baseplate 202) of the first loudspeaker motor (e.g., loudspeaker motor 201) during operation of the first loudspeaker motor (e.g., loudspeaker motor 201) such that the second magnetic flux leakage is redirected towards the first loudspeaker motor (e.g., loudspeaker motor 201).

Figure 3:
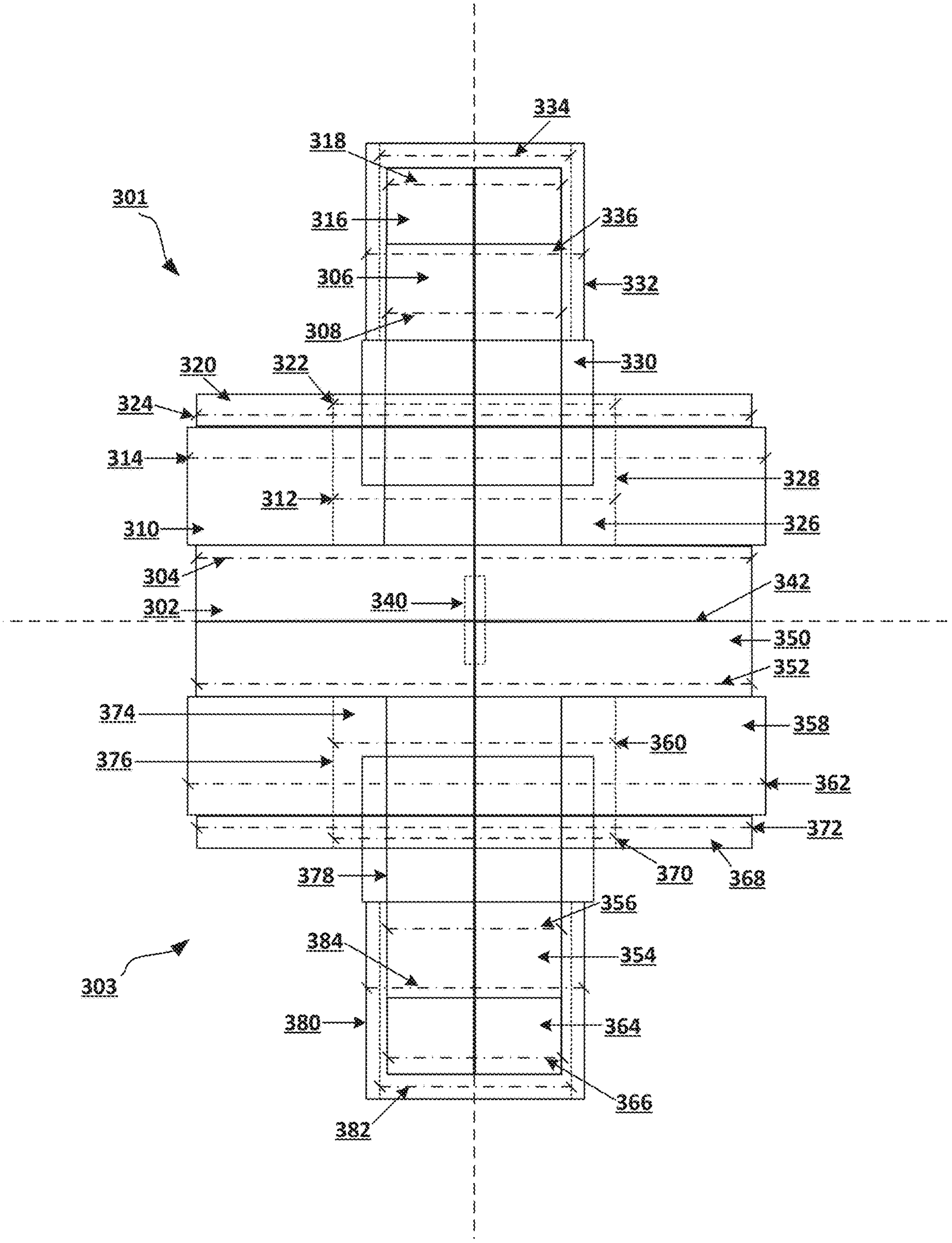
FIG. 3 illustrates an orthographic view of two example loudspeaker motors coupled together in accordance with various aspects of the present disclosure.

FIG. 3 illustrates an orthographic view of two example loudspeaker motors coupled together in accordance with various aspects of the present disclosure. It will be appreciated that the example loudspeaker motors depicted in FIG. 3 may be the same or similar to the example loudspeaker motors depicted in FIG. 2, and that the example depicted in FIG. 3 provides additional details related to the configuration and/or construction of various example embodiments described herein, such as in FIG. 2.

As shown in FIG. 3, in some examples, a first loudspeaker motor (e.g., loudspeaker motor 301) of a first loudspeaker may be coupled to a second loudspeaker motor (e.g., loudspeaker motor 303) of a second loudspeaker at a coupling area (e.g., coupling area 342). In some examples, the first loudspeaker motor (e.g., loudspeaker motor 301) comprises a first baseplate (e.g., baseplate 302) having a first circular shape and a first outer diameter (e.g., outer diameter 304), where the first baseplate (e.g., baseplate 302) comprises a first centrally located pole piece (e.g., centrally located pole piece 306) having a first cylindrical shape and a second outer diameter (e.g., outer diameter 308). In some examples, the second outer diameter (e.g., outer diameter 308) of the first centrally located pole piece (e.g., centrally located pole piece 306) may be smaller than the first outer diameter (e.g., outer diameter 304) of the first baseplate (e.g., baseplate 302), and the first centrally located pole piece (e.g., centrally located pole piece 306) protrudes from a top surface of the first baseplate (e.g., baseplate 302) at a right angle to the top surface of the first baseplate (e.g., baseplate 302).

Additionally, the first loudspeaker motor (e.g., loudspeaker motor 301) may comprise a first magnet (e.g., magnet 310) having a first ring shape, where the first magnet (e.g., magnet 310) comprises a first inner diameter (e.g., inner diameter 312) and a third outer diameter (e.g., outer diameter 314). In various examples, the first inner diameter (e.g., inner diameter 312) of the first magnet (e.g., magnet 310) may be larger than the second outer diameter (e.g., outer diameter 308) of the first centrally located pole piece (e.g., centrally located pole piece 306), and a bottom surface of the first magnet (e.g., magnet 310) may be coupled to the top surface of the first baseplate (e.g., baseplate 302).

In various examples, the first magnet (e.g., magnet 310) may be comprised of a plurality of discreet magnets (e.g., discreet ring magnets) having the same or similar attributes (e.g., a same or similar shape, outer diameter, inner diameter, thickness, material composition, and/or the like). Alternatively, in various examples, the first magnet (e.g., magnet 310) may be comprised of a plurality of discreet magnets (e.g., discreet ring magnets) having one or more varying attributes (e.g., discrete magnets comprising a respectively different shape, outer diameter, inner diameter, thickness, material composition, and/or the like). In such examples, the plurality of discreet magnets may be assembled (e.g., stacked, positioned, coupled, joined) in any suitable order and/or configuration to form a contiguous structure, where the contiguous structure comprising the plurality of discreet magnets is positioned within a first baseplate (e.g., baseplate 302) and a first top plate (e.g., top plate 320) in the same manner as the first magnet (e.g., magnet 310) illustrated in FIG. 3.

Furthermore, in various examples, the first magnet (e.g., magnet 310) may be comprised of a set of one or more discreet magnets and one or more discreet objects (e.g., steel objects, magnetic objects, ferrous objects) that have the same or similar attributes (e.g., a same or similar shape, outer diameter, inner diameter, thickness, material composition, and/or the like) as the one or more discreet magnets. Alternatively, in some examples, the first magnet (e.g., magnet 310) may be comprised of a set of one or more discreet magnets and one or more discreet objects (e.g., steel objects, magnetic objects, ferrous objects) that have one or more varying attributes (e.g., discrete magnets and discrete objects comprising a respectively different shape, outer diameter, inner diameter, thickness, material composition, and/or the like) as the one or more discreet magnets. In such examples, the set of one or more discreet magnets and the one or more discreet objects may be assembled (e.g., stacked, positioned, coupled, joined) in any suitable order and/or configuration to form a contiguous structure, where the contiguous structure comprising the set of the one or more discreet magnets and the one or more discreet objects is positioned within a first baseplate (e.g., baseplate 302) and a first top plate (e.g., top plate 320) in the same manner as the first magnet (e.g., magnet 310) illustrated in FIG. 3.

In some examples, the first loudspeaker motor (e.g., loudspeaker motor 301) may comprise a second magnet (e.g., magnet 316) having a second cylindrical shape, where the second magnet (e.g., magnet 316) has a fourth outer diameter (e.g., outer diameter 318). In such examples, the fourth outer diameter (e.g., outer diameter 318) may match the second outer diameter (e.g., outer diameter 308) of the first centrally located pole piece (e.g., centrally located pole piece 306), and the second magnet (e.g., magnet 316) may be coupled to a distal end of the first centrally located pole piece (e.g., centrally located pole piece 306).

In some examples, the first loudspeaker motor (e.g., loudspeaker motor 301) may comprise a first top plate (e.g., top plate 320) having a second ring shape, where the first top plate (e.g., top plate 320) comprises a second inner diameter (e.g., inner diameter 322) and a fifth outer diameter (e.g., outer diameter 324). Furthermore, in various examples, the second inner diameter (e.g., inner diameter 322) of the first top plate (e.g., top plate 320) may match the first inner diameter (e.g., inner diameter 312) of the first magnet (e.g., magnet 310), and a bottom surface of the first top plate (e.g., top plate 320) may be coupled to a top surface of the first magnet (e.g., magnet 310). In some examples, the fifth outer diameter (e.g., outer diameter 324) of the first top plate (e.g., top plate 320) may match the third outer diameter (e.g., outer diameter 314) of the first magnet (e.g., magnet 310) such that the fifth outer diameter and the third outer diameter are the same or similar to within a predefined tolerance (e.g., to within a 5% manufacturing tolerance, or any other predetermined, acceptable manufacturing tolerance). Alternatively, in other examples, the fifth outer diameter (e.g., outer diameter 324) of the first top plate (e.g., top plate 320) may differ from the third outer diameter (e.g., outer diameter 314) of the first magnet (e.g., magnet 310) such that the fifth outer diameter and the third outer diameter are not the same.

In some examples, a first clearance (e.g., clearance 326) may be formed between a first outer surface of the first centrally located pole piece (e.g., centrally located pole piece 306) of the first baseplate (e.g., baseplate 302) and a first continuous inner surface (e.g., continuous inner surface 328). As shown, the first continuous inner surface (e.g., continuous inner surface 328) may be comprised of a first inner surface of the first magnet (e.g., magnet 310) and a second inner surface of the first top plate (e.g., top plate 320).

The first loudspeaker motor (e.g., loudspeaker motor 301) may comprise a first voice coil (e.g., voice coil 330), where the first voice coil (e.g., voice coil 330) may be comprised of a first conductive wire configured to receive one or more electrical signals. The first loudspeaker motor (e.g., loudspeaker motor 301) may also comprise a first voice coil former (e.g., voice coil former 332) having a third ring shape, where the first voice coil former (e.g., voice coil former 332) comprises a third inner diameter (e.g., inner diameter 334) and a sixth outer diameter (e.g., outer diameter 336). In such examples, the first voice coil (e.g., voice coil 330) may be wrapped around the first voice coil former (e.g., voice coil former 332). As shown, the first voice coil former (e.g., voice coil former 332) may be configured to be suspended over the first centrally located pole piece (e.g., centrally located pole piece 306) and within the first clearance (e.g., clearance 326).

As shown in FIG. 3, in some examples, the second loudspeaker motor (e.g., loudspeaker motor 303) comprises a second baseplate (e.g., baseplate 350) having a second circular shape and a seventh outer diameter (e.g., outer diameter 352). In some examples, the second circular shape and the seventh outer diameter (e.g., outer diameter 352) of the second baseplate (e.g., baseplate 350) of the second loudspeaker motor (e.g., loudspeaker motor 303) match the first circular shape and the first outer diameter (e.g., outer diameter 304) of the first outer diameter (e.g., outer diameter 304) of the first baseplate (e.g., baseplate 302) of the first loudspeaker motor (e.g., loudspeaker motor 301) respectively. Additionally, as shown, the second baseplate (e.g., baseplate 350) may comprise a second centrally located pole piece (e.g., centrally located pole piece 354) having a third cylindrical shape and an eighth outer diameter (e.g., outer diameter 356). In some examples, the eighth outer diameter (e.g., outer diameter 356) of the second centrally located pole piece (e.g., centrally located pole piece 354) may be smaller than the seventh outer diameter (e.g., outer diameter 352) of the second baseplate (e.g., baseplate 350). As shown, the second centrally located pole piece (e.g., centrally located pole piece 354) may protrude from a top surface of the second baseplate (e.g., baseplate 350) at a right angle to the top surface of the second baseplate (e.g., baseplate 350).

In some examples, the second loudspeaker motor (e.g., loudspeaker motor 303) comprises a third magnet (e.g., magnet 358) having a fourth ring shape, where the third magnet (e.g., magnet 358) comprises a fourth inner diameter (e.g., inner diameter 360) and a ninth outer diameter (e.g., outer diameter 362). In various examples, the fourth inner diameter (e.g., inner diameter 360) of the third magnet (e.g., magnet 358) may be larger than the eighth outer diameter (e.g., outer diameter 356) of the second centrally located pole piece (e.g., centrally located pole piece 354), and a bottom surface of the third magnet (e.g., magnet 358) may be coupled to the top surface of the second baseplate (e.g., baseplate 350).

In various examples, the third magnet (e.g., magnet 358) may be comprised of a plurality of discreet magnets (e.g., discreet ring magnets) having the same or similar attributes (e.g., a same or similar shape, outer diameter, inner diameter, thickness, material composition, and/or the like). Alternatively, in various examples, the third magnet (e.g., magnet 358) may be comprised of a plurality of discreet magnets (e.g., discreet ring magnets) having one or more varying attributes (e.g., discrete magnets comprising a respectively different shape, outer diameter, inner diameter, thickness, material composition, and/or the like). In such examples, the plurality of discreet magnets may be assembled (e.g., stacked, positioned, coupled, joined) in any suitable order and/or configuration to form a contiguous structure, where the contiguous structure comprising the plurality of discreet magnets is positioned within a second baseplate (e.g., baseplate 350) and a second top plate (e.g., top plate 368) in the same manner as the third magnet (e.g., magnet 358) illustrated in FIG. 3.

Furthermore, in various examples, the third magnet (e.g., magnet 358) may be comprised of a set of one or more discreet magnets and one or more discreet objects (e.g., steel objects, magnetic objects, ferrous objects) that have the same or similar attributes (e.g., a same or similar shape, outer diameter, inner diameter, thickness, material composition, and/or the like) as the one or more discreet magnets. Alternatively, in some examples, the third magnet (e.g., magnet 358) may be comprised of a set of one or more discreet magnets and one or more discreet objects (e.g., steel objects, magnetic objects, ferrous objects) that have one or more varying attributes (e.g., discrete magnets and discrete objects comprising a respectively different shape, outer diameter, inner diameter, thickness, material composition, and/or the like) as the one or more discreet magnets. In such examples, the set of one or more discreet magnets and the one or more discreet objects may be assembled (e.g., stacked, positioned, coupled, joined) in any suitable order and/or configuration to form a contiguous structure, where the contiguous structure comprising the set of the one or more discreet magnets and the one or more discreet objects is positioned within a second baseplate (e.g., baseplate 350) and a second top plate (e.g., top plate 368) in the same manner as the third magnet (e.g., magnet 358) illustrated in FIG. 3.

Additionally, in some examples, the second loudspeaker motor (e.g., loudspeaker motor 303) may comprise a fourth magnet (e.g., magnet 364) having a fourth cylindrical shape. The fourth magnet (e.g., magnet 364) may have a tenth outer diameter (e.g., outer diameter 366), where the tenth outer diameter (e.g., outer diameter 366) matches the eighth outer diameter (e.g., outer diameter 356) of the second centrally located pole piece (e.g., centrally located pole piece 354). In some examples, the fourth magnet (e.g., magnet 364) may be coupled to a distal end of the second centrally located pole piece (e.g., centrally located pole piece 354).

As shown, the second loudspeaker motor (e.g., loudspeaker motor 303) may comprise a second top plate (e.g., top plate 368) having a fifth ring shape, where the second top plate (e.g., top plate 368) comprises a fifth inner diameter (e.g., inner diameter 370) and an eleventh outer diameter (e.g., outer diameter 372). In some examples, the fifth inner diameter (e.g., inner diameter 370) of the second top plate (e.g., top plate 368) matches the fourth inner diameter (e.g., inner diameter 360) of the third magnet (e.g., magnet 358), and a bottom surface of the second top plate (e.g., top plate 368) may be coupled to a top surface of the third magnet (e.g., magnet 358).

In some examples, the eleventh outer diameter (e.g., outer diameter 372) of the second top plate (e.g., top plate 368) may match the ninth outer diameter (e.g., outer diameter 362) of the third magnet (e.g., magnet 358) such that the eleventh outer diameter and the ninth outer diameter are the same or similar to within a predefined tolerance (e.g., to within a 5% manufacturing tolerance, or any other predetermined, acceptable manufacturing tolerance). Alternatively, in other examples, the eleventh outer diameter (e.g., outer diameter 372) of the second top plate (e.g., top plate 368) may differ from the ninth outer diameter (e.g., outer diameter 362) of the third magnet (e.g., magnet 358) such that the eleventh outer diameter and the ninth outer diameter are not the same.

In some examples, a second clearance (e.g., clearance 374) may be formed between a second outer surface of the second centrally located pole piece (e.g., centrally located pole piece 354) of the second baseplate (e.g., baseplate 350) and a second continuous inner surface (e.g., continuous inner surface 376). As shown, the second continuous inner surface (e.g., continuous inner surface 376) may be comprised of a third inner surface of the third magnet (e.g., magnet 358) and a fourth inner surface of the second top plate (e.g., top plate 368).

Additionally, the second loudspeaker motor (e.g., loudspeaker motor 303) may comprise a second voice coil (e.g., voice coil 378), where the second voice coil (e.g., voice coil 378) may be comprised of a second conductive wire configured to receive one or more electrical signals. As shown the second loudspeaker motor (e.g., loudspeaker motor 303) may further comprise a second voice coil former (e.g., voice coil former 380) having a sixth ring shape, where the second voice coil former comprises a sixth inner diameter (e.g., inner diameter 382) and a twelfth outer diameter (e.g., outer diameter (e.g., outer diameter 384)). The second voice coil (e.g., voice coil 378) may be wrapped around the second voice coil former (e.g., voice coil former 380), and the second voice coil former (e.g., voice coil former 380) may be configured to be suspended over the second centrally located pole piece (e.g., centrally located pole piece 354) and within the second clearance (e.g., clearance 374).

As depicted, the first loudspeaker motor (e.g., loudspeaker motor 301) and the second loudspeaker motor (e.g., loudspeaker motor 303) may be coupled (e.g., connected, joined, attached, adhered, fastened) at a coupling area (e.g., coupling area 342). In various examples, the coupling area (e.g., coupling area 342) is associated with the respective bottom surfaces of the first baseplate (e.g., baseplate 302) of the first loudspeaker motor (e.g., loudspeaker motor 301) and the second baseplate (e.g., baseplate 350) of the second loudspeaker motor (e.g., loudspeaker motor 303). In various examples, the first loudspeaker motor (e.g., loudspeaker motor 301) and the second loudspeaker motor (e.g., loudspeaker motor 303) may be coupled (e.g., connected, joined, attached, adhered, fastened) at the coupling area (e.g., coupling area 342) via one or more methods.

For example, the first loudspeaker motor (e.g., loudspeaker motor 301) and the second loudspeaker motor (e.g., loudspeaker motor 303) may be coupled at the coupling area (e.g., coupling area 342) by a locating pin (e.g., locating pin 340). The locating pin (e.g., locating pin 340) may be constructed of a rigid material (e.g., metal, plastic, composite, and/or the like) and inserted into the first baseplate (e.g., baseplate 302) of the first loudspeaker motor (e.g., loudspeaker motor 301) and the second baseplate (e.g., baseplate 350) of the second loudspeaker motor (e.g., loudspeaker motor 303) respectively. Additionally or alternatively, the locating pin (e.g., locating pin 340) may be constructed from magnetic (e.g., ferrous) or non-magnetic (e.g., non-ferrous) materials. In some examples, the locating pin (e.g., locating pin 340) may comprise a solid core and may configured in a solid dowel shape.

Alternatively, in various examples, the locating pin (e.g., locating pin 340) may be configured as a coiled spring pin (aka. spiral pin), where the locating pin is configured to roll and/or coil around itself such that the diameter of the locating pin is changed (e.g., reduced) as the locating pin is inserted into a mating hole (e.g., a hole associated with the first baseplate (e.g., baseplate 302) and/or the second baseplate (e.g., baseplate 350)). Alternatively, in some examples, the locating pin (e.g., locating pin 340) may be configured as a slotted spring pin, where the locating pin is configured to be compressed such that the diameter of the locating pin is changed (e.g., reduced) as the locating pin is inserted into a mating hole (e.g., a hole associated with the first baseplate (e.g., baseplate 302) and/or the second baseplate (e.g., baseplate 350)).

Locating pins configured as a coiled spring pin or a slotted spring pin that are utilized to couple two loudspeaker motors as described herein may exert an outward pressure on the walls of the respective mating holes associated with the first baseplate (e.g., baseplate 302) and the second baseplate (e.g., baseplate 350). Such outward pressure is a result of the spring-like elastic force of the locating pin which returns the locating pin to its natural, "resting," state. When inserted into the respective mating holes of the first baseplate (e.g., baseplate 302) and the second baseplate (e.g., baseplate 350), the outward pressure of the locating pin may provide friction between the outer surface of the locating pin and the inner wall of the respective mating holes that can be utilized to hold the first loudspeaker motor (e.g., loudspeaker motor 301) and the second loudspeaker motor (e.g., loudspeaker motor 303) together to maintain the coupled configuration depicted in FIG. 3.

In various examples, a first portion of the locating pin (e.g., locating pin 340) is inserted into the first baseplate (e.g., baseplate 302) of the first loudspeaker motor (e.g., loudspeaker motor 301) at a center point of an outer diameter (e.g., outer diameter 308) of a first centrally located pole piece (e.g., centrally located pole piece 306) of the first loudspeaker motor, and a second portion of the locating pin is inserted into the second baseplate (e.g., baseplate 350) of the second loudspeaker motor (e.g., loudspeaker motor 301) at a center point of an outer diameter (e.g., outer diameter 356) of a second centrally located pole piece (e.g., centrally located pole piece 354) of the second loudspeaker motor such that a first central axis of the first loudspeaker motor aligns with a second central axis of the second loudspeaker motor. In various examples, the first portion of the locating pin (e.g., locating pin 340) may be longer or shorter than the second portion of the locating pin.

In some examples, a locating pin (e.g., locating pin 340) may be force fit into the respective baseplates of the first loudspeaker motor (e.g., loudspeaker motor 301) and the second loudspeaker motor (e.g., loudspeaker motor 303) such that the two loudspeaker motors are coupled together based on the friction created by the force fitting of the locating pin into the respective baseplates (e.g., baseplate 302 and baseplate 350). Additionally or alternatively, the locating pin (e.g., locating pin 340) that couples the first loudspeaker motor (e.g., loudspeaker motor 301) and the second loudspeaker motor (e.g., loudspeaker motor 303) together may be adhered to the respective loudspeaker motors via an adhesive (e.g., glue, epoxy, resin, and/or the like). Additionally or alternatively, the locating pin (e.g., locating pin 340) may couple the first loudspeaker motor (e.g., loudspeaker motor 301) and the second loudspeaker motor (e.g., loudspeaker motor 303) together utilizing a combination of force fitting and an adhesive.

Additionally or alternatively, in various examples, an adhesive (e.g., glue, epoxy, resin, and/or the like) may be applied to coupling area (e.g., coupling area 342) such that the respective bottom surfaces of the first baseplate (e.g., baseplate 302) of the first loudspeaker motor (e.g., loudspeaker motor 301) and the second baseplate (e.g., baseplate 350) of the second loudspeaker motor (e.g., loudspeaker motor 303) are coupled together via the adhesive. In some examples, the first loudspeaker motor (e.g., loudspeaker motor 301) and the second loudspeaker motor (e.g., loudspeaker motor 303) may be coupled together by both a locating pin (e.g., locating pin 340) and an adhesive applied to the coupling area (e.g., coupling area 342).

Additionally or alternatively, in some embodiments, the first loudspeaker motor (e.g., loudspeaker motor 301) and the second loudspeaker motor (e.g., loudspeaker motor 303) may be coupled together by a structural housing of an electronic device (e.g., a digital assistant, a multimedia device, a portable audio device, smart home device, and/or the like) encompassing the a first loudspeaker comprising the first loudspeaker motor (e.g., loudspeaker motor 301) and a second loudspeaker comprising the second loudspeaker motor (e.g., loudspeaker motor 303). As such, the inner support structure of the electronic device may be configured such that the first loudspeaker motor (e.g., loudspeaker motor 301) and the second loudspeaker motor (e.g., loudspeaker motor 303) are held in place such that the first baseplate (e.g., baseplate 302) and the second baseplate (e.g., baseplate 350) are coupled together at the coupling area (e.g., coupling area 342). Additionally or alternatively, in various examples, the first loudspeaker motor (e.g., loudspeaker motor 301) and the second loudspeaker motor (e.g., loudspeaker motor 303) may be coupled together at the coupling area (e.g., coupling area 342) by two or more of a locating pin (e.g., locating pin 340), an adhesive, and/or a structural housing of an electronic device.

Alternatively, in various examples, the first baseplate (e.g., baseplate 302) of the first loudspeaker motor (e.g., loudspeaker motor 301) and the second baseplate (e.g., baseplate 350) of the second loudspeaker motor (e.g., loudspeaker motor 303) are a common baseplate. In such examples, the common baseplate may be a single structure configured to support the various components of a first loudspeaker and a second loudspeaker (e.g., loudspeaker motor components, loudspeaker structural components, and/or the like).

In this regard, by coupling the first loudspeaker motor (e.g., loudspeaker motor 301) and the second loudspeaker motor (e.g., loudspeaker motor 303) by their respective baseplate (e.g., baseplate 302 and baseplate 350), the loudspeakers and corresponding structural components (e.g., loudspeaker chassis, suspension membranes, and loudspeaker cones) associated with the first loudspeaker and the second loudspeaker may be oriented in opposing (e.g., opposite, or near-opposite) directions. As such, any sound pressure waves that originate from the first loudspeaker comprising the first loudspeaker motor (e.g., loudspeaker motor 301) and the second loudspeaker comprising the second loudspeaker motor (e.g., loudspeaker motor 303) may be originated and/or transmitted in opposing (e.g., opposite, or near-opposite) directions. Furthermore, when the first loudspeaker motor (e.g., loudspeaker motor 301)

and the second loudspeaker motor (e.g., loudspeaker motor 303) are provided the same electronic signals (e.g., the same AC signals are provided to both the first voice coil (e.g., voice coil 330) and the second voice coil (e.g., voice coil 378), the inertial moving masses of each respective loudspeaker (e.g., caused by the moving components of the respective loudspeakers such as voice coils, voice coil formers, suspension membranes, loudspeaker cones, and/or the like) will be out of phase. As such, the vibrations of the respective loudspeakers may cancel each other out and thereby prevent unintentional loudspeaker movement and/or electronic device movement resulting from the inertial moving masses of the respective loudspeakers.

In various examples, the first magnet (e.g., magnet 310) may be oriented such that the first baseplate (e.g., baseplate 302) has a first polarity associated with the first magnet (e.g., a polarity associated with a south pole of the magnet 310). Additionally, the third magnet (e.g., magnet 358) may be oriented such that the second baseplate (e.g., baseplate 350) has a second polarity associated with the third magnet (e.g., a polarity associated with a south pole of the magnet 358), where the first polarity may be a same polarity as the second polarity (e.g., the first and second polarity are associated with the south pole of the first and second magnets respectively).

As such, the first polarity of the first baseplate (e.g., baseplate 302) of the first loudspeaker motor (e.g., loudspeaker motor 301) may repel a first magnetic flux leakage associated with the second baseplate (e.g., baseplate 350) of the second loudspeaker motor (e.g., loudspeaker motor 303) during operation of the second loudspeaker motor such that the first magnetic flux leakage is redirected towards the second loudspeaker motor. Additionally, the second polarity of the second baseplate (e.g., baseplate 350) of the second loudspeaker motor (e.g., loudspeaker motor 303) may repel a second magnetic flux leakage associated with the first baseplate (e.g., baseplate 302) of the first loudspeaker motor (e.g., loudspeaker motor 301) during operation of the first loudspeaker motor (e.g., loudspeaker motor 301) such that the second magnetic flux leakage is redirected towards the first loudspeaker motor (e.g., loudspeaker motor 301).

In various examples, the respective components of the first loudspeaker motor (e.g., loudspeaker motor 301) and the second loudspeaker motor (e.g., loudspeaker motor 303) may be of the same or similar dimensions and/or configured according to the same or similar specifications (e.g., within a 5% manufacturing tolerance, or any other predetermined, acceptable manufacturing tolerance). Furthermore, a first loudspeaker comprising the first loudspeaker motor (e.g., loudspeaker motor 301) and a second loudspeaker comprising the second loudspeaker motor (e.g., loudspeaker motor 303) may comprise components (e.g., suspension membranes, loudspeaker cones, loudspeaker cone chassis) of the same or similar dimensions and/or configured according to the same or similar specifications (e.g., within a 5% manufacturing tolerance, or any other predetermined, acceptable manufacturing tolerance). In this regard, in some examples, the respective loudspeakers comprising the first loudspeaker motor (e.g., loudspeaker motor 301) and the second loudspeaker motor (e.g., loudspeaker motor 303) may be configured to have the same or similar acoustic output (e.g., SPL), frequency response, loudspeaker motor strength, and/or the like.

For example, the first magnet (e.g., magnet 310 of loudspeaker motor 301) and the third magnet (e.g., magnet 358 of loudspeaker motor 303) may be of the same or similar dimensions such that one or more of the first inner diameter (e.g., inner diameter 312) and the third outer diameter (e.g., outer diameter 314) of the first magnet are the same or similar to one or more of the fourth inner diameter (e.g., inner diameter 360) and the ninth outer diameter (e.g., outer diameter 362) of the third magnet respectively. As another example, the dimensions (e.g., length, diameter) of the first centrally located pole piece (e.g., centrally located pole piece 306) may be the same or similar to the dimensions of the second centrally located pole piece (e.g., centrally located pole piece 354) such that the second outer diameter (e.g., outer diameter 308) of the first centrally located pole piece is the same or similar to the eighth outer diameter (e.g., outer diameter 356) of the second centrally located pole piece.

Alternatively, in various examples, the respective components of the first loudspeaker motor (e.g., loudspeaker motor 301) and the second loudspeaker motor (e.g., loudspeaker motor 303) may be of different dimensions and/or configured according to different specifications. Furthermore, a first loudspeaker comprising the first loudspeaker motor (e.g., loudspeaker motor 301) and a second loudspeaker comprising the second loudspeaker motor (e.g., loudspeaker motor 303) may comprise components (e.g., suspension membranes, loudspeaker cones, loudspeaker cone chassis) of different dimensions and/or configured according to different specifications. In this regard, in some examples, the respective loudspeakers comprising the first loudspeaker motor (e.g., loudspeaker motor 301) and the second loudspeaker motor (e.g., loudspeaker motor 303) may be configured to have different acoustic output (e.g., SPL), frequency response, loudspeaker motor strength, and/or the like.

Figure 4:
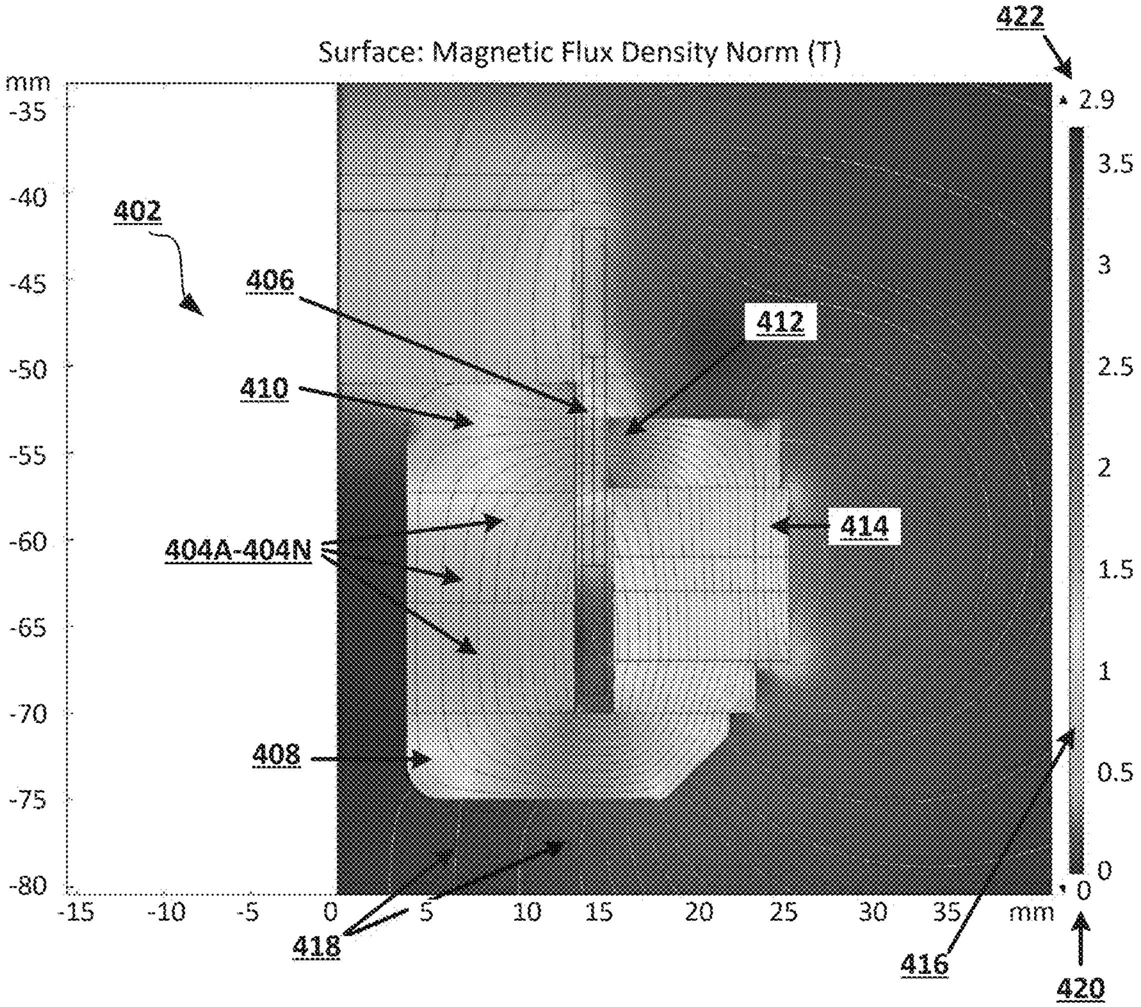
FIG. 4 depicts the results of a magnetic flux density simulation related to an example loudspeaker motor in accordance with various aspects of the present disclosure.

FIG. 4 depicts the results of a magnetic flux density simulation related to an example loudspeaker motor in accordance with various aspects of the present disclosure. Specifically, FIG. 4 depicts the results of a magnetic flux density simulation that illustrates the corresponding magnetic flux density for a single, example loudspeaker motor (e.g., loudspeaker motor 402).

Magnetic flux can be understood as a measurement of an amount of a magnetic field (e.g., represented by magnetic field lines associated with the magnetic field) passing through a given area such as a conductive coil. Magnetic flux is denoted by $\phi$, and when measured is associated with the International System of Units (SI) unit, Weber (Wb). Magnetic flux can be defined as $\phi=B_{\parallel}A\cos\theta$, where B is the magnetic field strength in Teslas (T) or Webers (Wb) per meter squared ($Wb/m^2$), where 1 T=1 $Wb/m^2$, A is the area of a conductor through which the magnetic field lines project in meters squared ($m^2$), and $\theta$ is the angle between the magnetic field lines and the normal area of the area A.

Magnetic flux density is a measurement of the amount of magnetic flux passing through a defined area (e.g., a number of magnetic field lines moving through a given area such as a magnetic circuit). Magnetic flux density is denoted by B, and, as described herein, when measured is associated with SI units T or $Wb/m^2$, where 1 T=1 $Wb/m^2$. Magnetic flux density is a vector number and estimates the magnetic field strength and direction of a magnetic field associated with a magnet or electric current. Additionally, magnetic flux density may be understood via the relation of a force operating on a conductive wire that is positioned at right angles to the corresponding magnetic field and can be defined by the equation $B=F/Il$, where F is the force, I is the electrical current flowing through the wire, and l is the length of the wire.

As shown in FIG. 4, magnetic flux and magnetic flux density associated with a particular surface or object can be visualized via the magnetic field lines associated with a particular magnetic field passing through said surface or object. For example, as depicted, the magnetic flux lines 404A-404N represent the strength and direction of the magnetic field associated with a single loudspeaker motor (e.g., loudspeaker motor 402). The areas of an example loudspeaker motor (e.g., loudspeaker motor 402) with the highest magnetic flux density are those in which the magnetic flux lines 404A-404N are closest together. For example, as shown, one of the areas of the example loudspeaker motor 402 associated with the highest flux density includes the middle section of the baseplate 408. As another example, one of the areas of the example loudspeaker motor 402 associated with the highest flux density includes the section of top plate 412 adjacent to voice coil 406 which is suspended in the clearance created by the centrally located pole piece 410 and the top plate 412 coupled to the magnet 414.

In addition to the magnetic field lines 404A-404N, the color scheme associated with the numerical value range element 416 (e.g., indicating numerical values associated with the magnetic flux density norm (T)) also indicates the magnetic flux density for a given area of the example loudspeaker motor 402. The numerical value range element 416 further indicates a minimum magnetic flux density value 420 and a maximum magnetic flux density value 422. As shown by the maximum magnetic flux density value 422, the maximum magnetic flux density for a given area of an example loudspeaker motor (e.g., loudspeaker motor 402) is simulated at 2.9 T.

FIG. 4 further illustrates magnetic flux leakage (e.g., magnetic flux leakage 418) associated with an example loudspeaker motor (e.g., loudspeaker motor 402). The magnetic flux leakage 418 represents portions of magnetic flux (e.g., indicated by magnetic field lines 404A-404N) that do not follow an intended path through the magnetic circuit of an example loudspeaker motor (e.g., loudspeaker motor 402). As described herein, the magnetic flux leakage (e.g., magnetic flux leakage 418) can lead to a number of inefficiencies and performance limitations in a loudspeaker motor (e.g., loudspeaker motor 402). The magnetic flux passing through a loudspeaker motor (e.g., loudspeaker motor 402) is generated in part by an electrical signal provided to a voice coil (e.g., voice coil 406) of the loudspeaker motor, and the magnetic flux leakage (e.g., magnetic flux leakage 418) can be understood as wasted potential energy that leads to the inefficient performance of the loudspeaker motor. Therefore, magnetic flux leakage (e.g., magnetic flux leakage 418) in a loudspeaker motor (e.g., loudspeaker motor 402) can cause degradations in the strength (aka. the force factor) of the loudspeaker motor. Such degradations in the strength of a loudspeaker motor may directly impact the sensitivity and/or efficiency of a loudspeaker comprising said loudspeaker motor, (e.g., the SPL of the loudspeaker). The SPL of a loudspeaker directly correlates to the volume output of the loudspeaker such that limitations in the strength of a corresponding loudspeaker motor (e.g., as caused by magnetic flux leakage 418 in loudspeaker motor 402) directly limit the maximum acoustic output of the loudspeaker.

Figure 5:
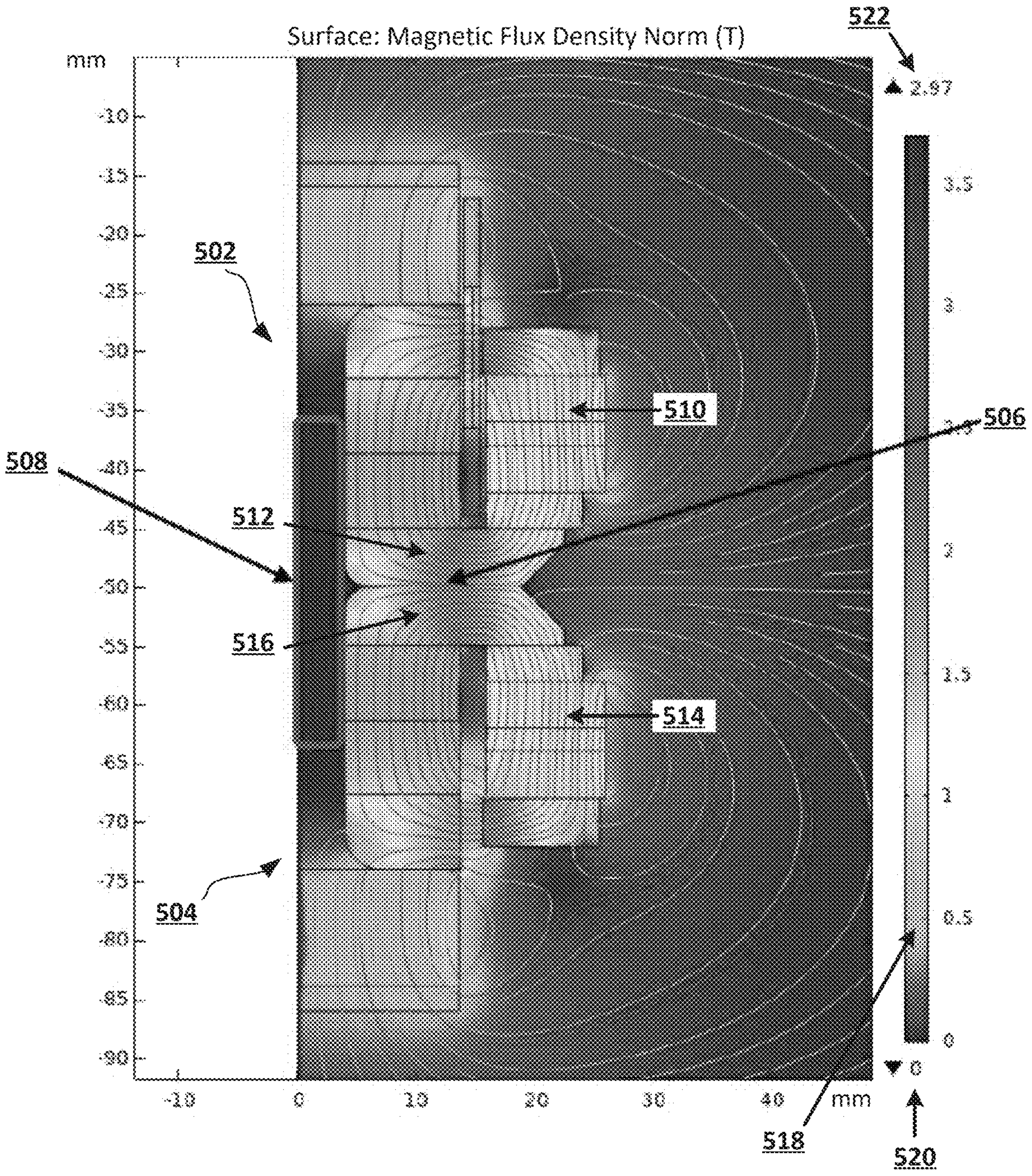
FIG. 5 depicts the results of a magnetic flux density simulation related to two example loudspeaker motors coupled together in accordance with various aspects of the present disclosure.

FIG. 5 depicts the results of a magnetic flux density simulation related to two example loudspeaker motors coupled together in accordance with various aspects of the present disclosure. Specifically, FIG. 5 depicts the results of a magnetic flux density simulation that illustrates the corresponding magnetic flux density for two example loudspeaker motors (e.g., loudspeaker motor 502 and loudspeaker motor 504) coupled together at a coupling area (e.g., coupling area 506) by an example locating pin (e.g., locating pin 508).

Depicted in FIG. 5 is a first magnet (e.g., magnet 510) of the first loudspeaker motor (e.g., loudspeaker motor 502) which is oriented such that a first baseplate (e.g., baseplate 512) of the first loudspeaker motor has a first polarity (e.g., associated with a south pole of the first magnet) associated with the first magnet. Also depicted is a second magnet (e.g., magnet 514) of the second loudspeaker motor (e.g., loudspeaker motor 504) which is oriented such that a second baseplate (e.g., baseplate 516) of the second loudspeaker motor has a second polarity associated with the second magnet, where the first polarity of the first baseplate (e.g., baseplate 512) is a same polarity as the second polarity of the second baseplate (e.g., baseplate 516) such that the first polarity and the second polarity are associated with the south pole of the first magnet and the south pole of the second magnet respectively. As such, the first polarity of the first baseplate (e.g., baseplate 512) of the first loudspeaker motor (e.g., loudspeaker motor 502) may repel a first magnetic flux leakage associated with the second baseplate (e.g., baseplate 516) of the second loudspeaker motor (e.g., loudspeaker motor 504) during operation of the second loudspeaker motor such that the first magnetic flux leakage is redirected towards the second loudspeaker motor. Additionally, the second polarity of the second baseplate (e.g., baseplate 516) of the second loudspeaker motor (e.g., loudspeaker motor 504) may repel a second magnetic flux leakage associated with the first baseplate (e.g., baseplate 512) of the first loudspeaker motor (e.g., loudspeaker motor 502) during operation of the first loudspeaker motor such that the second magnetic flux leakage is redirected towards the first loudspeaker motor.

Accordingly, by coupling the first loudspeaker motor (e.g., loudspeaker motor 502) and the second loudspeaker motor (e.g., loudspeaker motor 504), the magnetic flux leakage that may have resulted from the first loudspeaker motor and/or the second loudspeaker motor being the sole loudspeaker motor (e.g., associated with a single loudspeaker integrated with a particular electronic device) may be harnessed and redirected towards the respective loudspeaker motors to increase the magnetic flux density of the respective loudspeaker motors, thereby increasing the efficiency of the loudspeaker motors, the motor strength (e.g., the force factor) of the loudspeaker motors, and the SPL of the respective loudspeakers comprising the first and second loudspeaker motors.

The increase in magnetic flux density based on coupling a first loudspeaker motor (e.g., loudspeaker motor 502) to a second loudspeaker motor (e.g., loudspeaker motor 504) is displayed by the numerical value range element 518 (e.g., indicating numerical values associated with the magnetic flux density norm (T)) which indicates the magnetic flux density for a given area of the first loudspeaker motor and/or the second loudspeaker motor. The numerical value range element 518 indicates a minimum magnetic flux density value 520 and a maximum magnetic flux density value 522. As shown by the maximum magnetic flux density value 522, the maximum magnetic flux density for a given area of the first loudspeaker motor and/or the second loudspeaker motor (e.g., loudspeaker motors 502 and/or 504 respectively) is simulated at 2.97 T, which is an increased maximum magnetic flux density value than that which was simulated for a single example loudspeaker motor (e.g., loudspeaker motor 402 associated with a maximum magnetic flux density of 2.9 T) and described with reference to FIG. 4.

Figure 6:
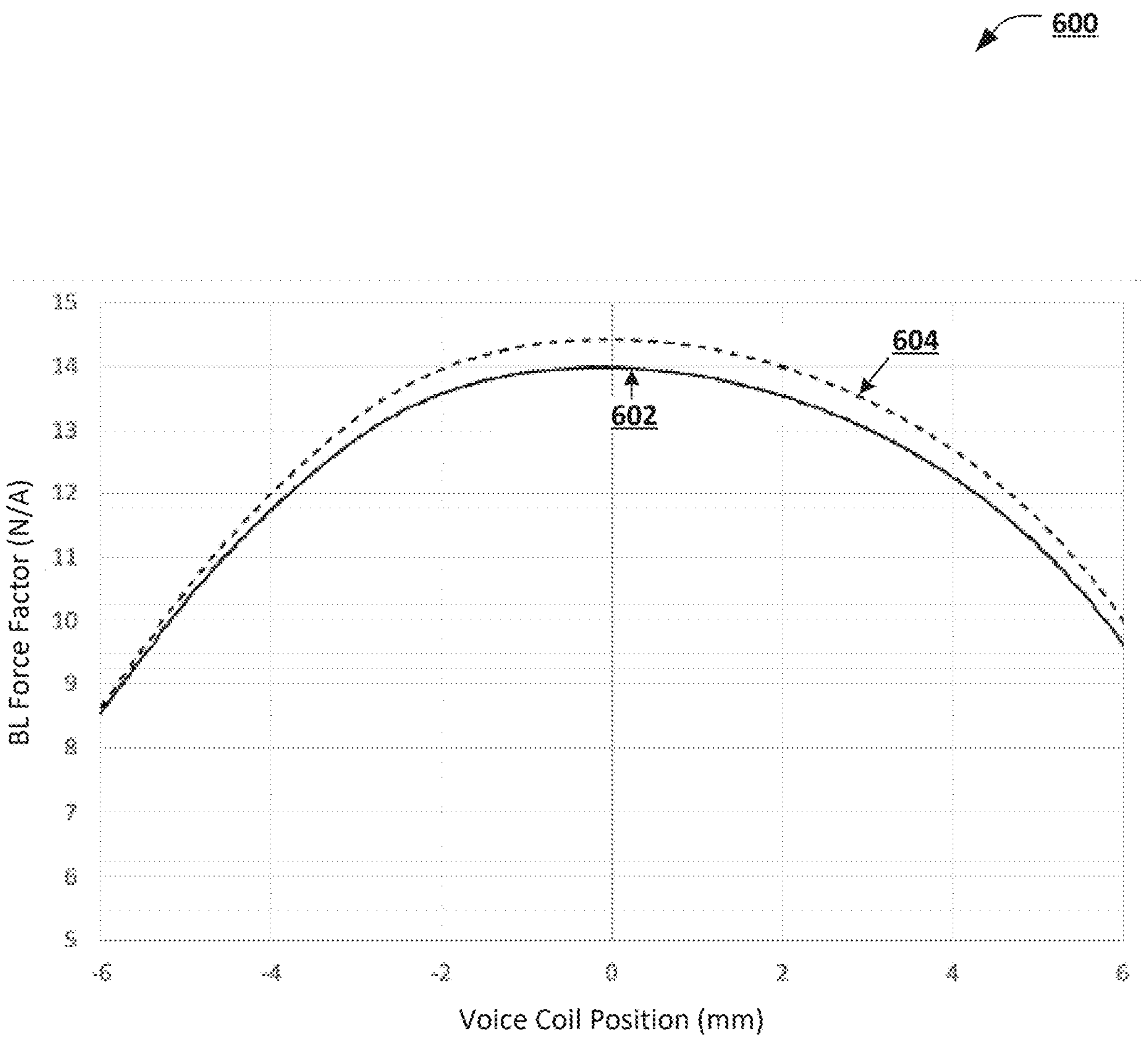
FIG. 6 depicts a graph detailing a realized force factor improvement of two example loudspeakers coupled together in accordance with various aspects of the present disclosure.

FIG. 6 depicts a graph detailing a realized force factor improvement for two example loudspeakers coupled together in accordance with various aspects of the present disclosure. As shown, FIG. 6 depicts a graph 600 comprising a line 602 associated with the force factor of a single example loudspeaker motor (e.g., loudspeaker motor 402), and a line 604 associated with the force factor of two example loudspeaker motors (e.g., loudspeaker motor 502 and loudspeaker motor 504) coupled together based on various techniques described herein. As indicated by the graph 600, the force factor of a particular loudspeaker motor (e.g., loudspeaker motor 402) can be modeled relative to a position (e.g., a displacement) of a corresponding voice coil (e.g., voice coil 406) comprised by the particular loudspeaker motor. The force factor of a loudspeaker motor, sometimes referred to as Bl force factor, describes the relative strength of the loudspeaker motor. In this regard, the force factor (F) of a particular loudspeaker motor may be understood as the magnetic flux density, B, over a voice coil of length, l, relative to a current, I, being supplied to the voice coil, and can be defined as F=B*l*I. The force factor can be represented in Newtons per ampere meter (N/A), where 1 T=1N/A.

As indicated by the graph 600, the force factor of a respective loudspeaker motor (e.g., loudspeaker motor 402) decreases relative to the positive and negative displacement of the corresponding voice coil (e.g., voice coil 406) of the loudspeaker motor during operation (e.g. relative to a neutral position of the voice coil). This is due in part to the fact that, during operation, one or more portions of the conductive wire of the voice coil (e.g., voice coil 406) extend past the clearance formed by the centrally located pole piece (e.g., centrally located pole piece 410), the top plate (e.g., top plate 412), and the magnet (e.g., magnet 414) where the magnetic flux density is high. Said differently, the force factor of a particular loudspeaker is highest when the corresponding voice coil (e.g., voice coil 406) is in the neutral position (e.g., resting position).

As described herein, the line 602 of the graph 600 represents the force factor of a single example loudspeaker motor (e.g., loudspeaker motor 402), and the line 604 associated with the force factor of two example loudspeaker motors (e.g., loudspeaker motor 502 and loudspeaker motor 504) coupled together based on various techniques described herein. As illustrated by the line 604, the force factor associated with the coupled loudspeaker motors is higher than the single loudspeaker motor represented by the line 602. For example, when the voice coil (e.g., voice coil 406) of the single loudspeaker motor (e.g., loudspeaker motor 402) is in a neutral position (e.g., represented by the zero position on the x-axis of graph 600), the maximum force factor of the single loudspeaker motor is 14N/A. In contrast, when a voice coil of one of the coupled loudspeaker motors (e.g., loudspeaker motor 502 and/or loudspeaker motor 504) is in a neutral position, the maximum force factor of the coupled loudspeaker motors is approximately 14.5N/A. Furthermore, as illustrated by the lines 602 and 604, the force factor of the coupled loudspeaker motors (e.g., loudspeaker motor 502 and loudspeaker motor 504) is higher relative to the force factor of the single loudspeaker motor (e.g., loudspeaker motor 402) for every position (e.g., every amount of displacement, positive or negative) of the respective voice coils. This is a direct result of the increase in the magnetic flux density of the respective coupled loudspeaker motors achieved by redirecting the respective magnetic flux leakage of the respective coupled loudspeakers to the intended paths associated with the respective loudspeaker motors.

Now that various examples of improved loudspeaker performance utilizing coupled loudspeaker motors has been described above with reference to FIGS. 1-6, examples of electronic devices that may benefit from such loudspeaker coupling techniques will now be described in further detail below with reference to FIG. 7.

Figure 7:
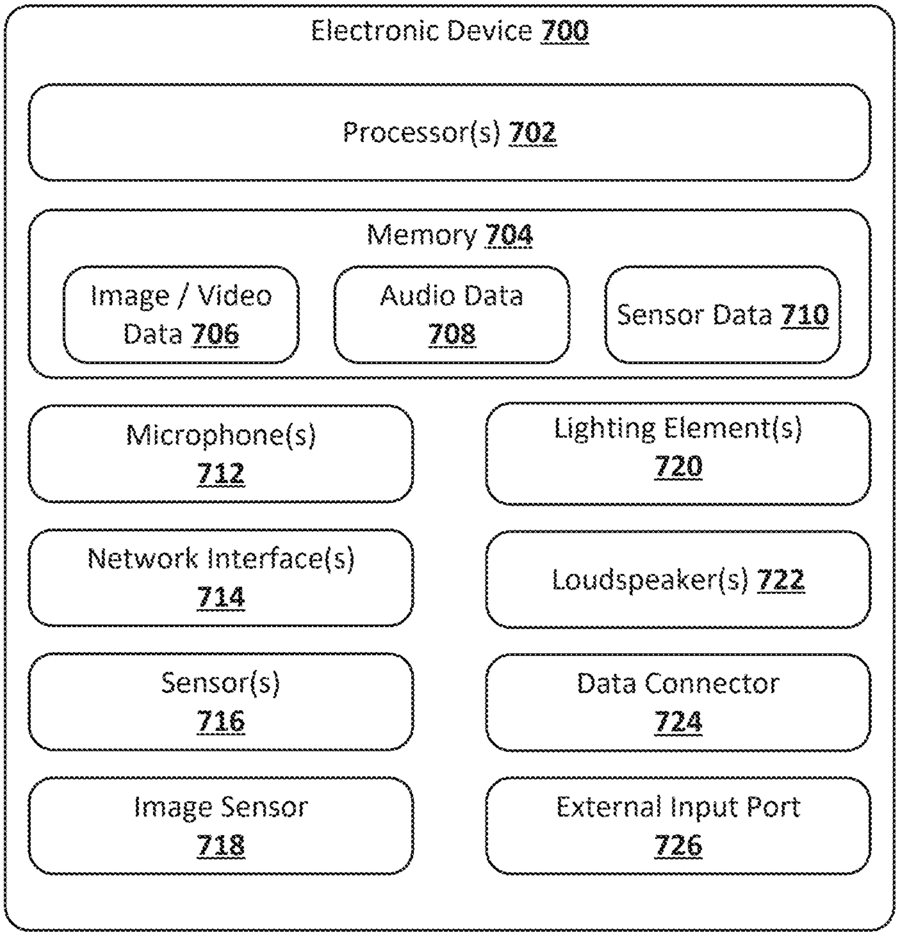
FIG. 7 illustrates an example electronic device incorporating two example loudspeaker motors coupled together in accordance with various aspects of the present disclosure.

FIG. 7 illustrates example components of an electronic device 700, according to various example embodiments of the present disclosure. In various embodiments, the electronic device 700 may be one or more of portable audio device, smart home device, digital assistant device, multimedia device, networked device, desktop computer, laptop computer, tablet computer, smartphone, kiosk, computing device, computing system, and/or the like. The electronic device 700 is shown including processor(s) 702 and memory 704, where the processor(s) 702 may perform various functions associated with controlling an operation of the electronic device 700, and the memory 704 may store instructions executable by the processor(s) 702 to perform the operations described herein.

In some embodiments, the electronic device 700 may include the image sensor 718 for capturing image/video data 706 within an environment of the electronic device 700. In some instances, the image sensor 718 may include Red, Green, Blue, Depth (RGBD) camera(s) and/or three-dimensional (3D) sensors. Additionally, the electronic device 700 may include other sensor(s) 716 (e.g., ambient light sensor, temperature sensor, accelerometer, ambient light sensor or photosensor, etc.) that generate the sensor data 710 (e.g., high or low logic indicators, ambient light values, and/or the like as described herein). In some instances, the image sensor 718 may be used to detect motion.

The electronic device 700 may also include lighting element(s) 720, such as IRLED(s) and/or wLED(s) (e.g., white or neutral light LED(s)). In some examples, the visible light source may be the same or similar to the wLED(s) (e.g., the visible light source may comprise one or more of the wLED(s) as described herein). In some examples, the infrared light source may be the same or similar to the IRLED(s) (e.g., the infrared light source may comprise one or more of the IRLED(s) as described herein). The lighting element(s) 720 may also output an indication of an operational status of the electronic device 700 (e.g., one or more of the wLED(s) may flash, blink, change color, and/or the like to indicate an operational status to a user).

The electronic device 700 may also include microphone (s) 712 that generate audio data 708. The loudspeakers 722 may be loudspeakers comprising respective loudspeaker motors and may be coupled together based on one or more of the various methods and/or techniques described herein. The loudspeakers 722 may output sound in a direction away from the electronic device 700. The sound output by the loudspeakers 722 may include the audio data 708, which may be received from one or more communicatively coupled computing devices, and/or other audio (e.g., siren, alarm, etc.).

The electronic device 700 may also include network interface(s) 714 to enable the electronic device 700 to communicate over one or more networks. Example network interface(s) 714 include, without limitation, Wi-Fi, Bluetooth, ZigBee, Bluetooth Low Energy (BLE), LTE, and so forth. The network interface(s) 714 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, inbound data from may be routed through the network interface(s) 714 before being directed to the processor(s) 702, and outbound data from the processor(s) 702 may be routed through the network interface(s) 714. The network interface(s) 714 may therefore receive inputs, such as data, from the processor(s) 702, the image sensor 718, and so forth. For example, the network interface(s) 714 may be configured to transmit data to and/or receive data from one or more network devices. The network interface(s) 714 may act as a conduit for data communicated between various components and the processor(s) 702.

Although certain components of the electronic device 700 are illustrated, it is to be understood that the electronic device 700 may include additional or alternative components. For example, the electronic device 700 may include other input/output devices (e.g., display screen), heat dissipating elements (e.g., heatsinks, fans, vents, etc.), computing components (e.g., Printed Circuit Boards (PCBs), antennas, ports (e.g., USB), and so forth. In some examples, the electronic device 200 may be powered by mains electricity (e.g., a wall socket coupled to a public power grid). In some examples, the electronic device 700 may be powered via one or more batteries. In some such examples, the one or more batteries may power the device instead of mains electricity and/or the one or more batteries may be a backup power supply, such as if the mains electricity is unavailable (e.g., during a power outage).

As used herein, a processor, such as the processor(s) 702, may include multiple processors and/or a processor having multiple cores. Further, the processor(s) 702 may comprise one or more cores of different types. For example, the processor(s) 702 may include application processor units, graphic processing units, and so forth. In one implementation, the processor(s) 702 may comprise a microcontroller and/or a microprocessor. The processor(s) 702 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), and/or the like. Additionally, each of the processor(s) 702 may possess its own local memory, which also may store program components, program data, program code, program instructions, and/or one or more operating systems.

Memory, such as the memory 704, may include volatile and nonvolatile memory, removable and non-removable media implemented in any method or technology for storage of information, such as computer-readable instructions, data structures, program component, or other data. The memory 704 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 704 may be implemented as computer-readable storage media ("CRSM"), which may be any available physical media accessible by the processor(s) 702 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, and which can be accessed by the processor(s). The memory 704 are examples of non-transitory computer-readable media. The memory 704 may store an operating system and one or more software applications, instructions, programs, and/or data to implement the methods described herein and the functions attributed to the various systems.

The electronic device 700 may further comprise a data connector 724 configured to connect to a host device (e.g., a television, personal computer, kiosk, electronic display, and/or the like) to provide one or more portions of data (e.g., multimedia data). In some embodiments, the data connector 724 may be configured as a USB connector (e.g., a USB 3.0 Type C or Type A connector), an HDMI connector, a mini-display connector, and/or the like. The electronic device 700 may further comprise an external input port 726 configured to receive a data connector for the purposes of charging an internal battery of the electronic device 700 and/or for transferring data to the electronic device 700 by means other than the network interface(s) 714.

Figure 8:
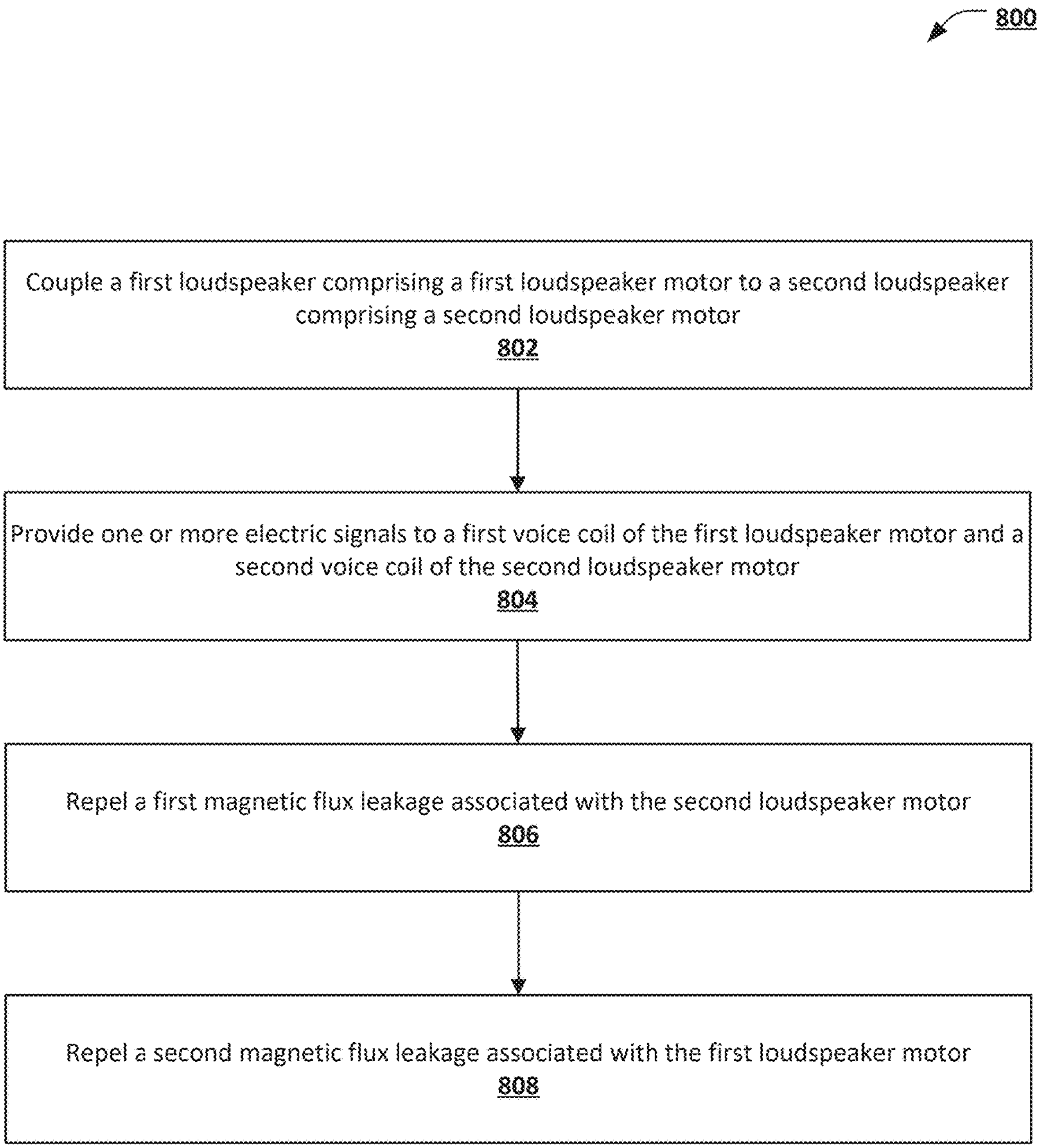
FIG. 8 illustrates a flowchart diagram of an example process for improving the performance of loudspeakers in accordance with various aspects of the present disclosure.

FIG. 8 illustrates a flowchart diagram of an example process 800 for improving the performance of loudspeakers in accordance with various aspects of the present disclosure. As shown, the process 800 may be used for coupling the respective loudspeaker motors (e.g., loudspeaker motors 301 and 303) of two loudspeakers in order to redirect magnetic flux leakage generated by the respective loudspeaker motors back towards the respective loudspeaker motors.

In various embodiments, the operations of process 800 may be facilitated and/or executed by a system comprising loudspeakers configured in accordance with the various aspects described herein. Additionally or alternatively, in some embodiments, the operations of the process 800 may represent one or more instructions of a series of instructions comprising computer readable machine code executable by a processing unit of one or more computing devices described herein (e.g., electronic device 700, and/or any other computing device), although various operations may also be implemented in, or using, hardware (e.g., circuitry and/or componentry of an example electronic device 700). In some examples, the computer readable machine code may be comprised of instructions selected from a native instruction set of at least one processor and/or an operating system of the electronic device 700.

As shown in FIG. 8, the process 800 may begin at operation 802, at which a first loudspeaker comprising a first loudspeaker motor (e.g., loudspeaker motor 301) is coupled (e.g., connected, joined, attached, adhered, fastened) to a second loudspeaker comprising a second loudspeaker motor (e.g., loudspeaker motor 303). In various embodiments, the first loudspeaker and the second loudspeaker may be coupled by a first baseplate (e.g., baseplate 302) of the first loudspeaker motor (e.g., loudspeaker motor 301) and the second baseplate (e.g., baseplate 350) of the second loudspeaker motor (e.g., loudspeaker motor 303).

For example, the first loudspeaker motor (e.g., loudspeaker motor 301) and the second loudspeaker motor (e.g., loudspeaker motor 303) may be coupled at a coupling area (e.g., coupling area 342) by a locating pin (e.g., locating pin 340), an adhesive (e.g., glue, epoxy, resin, and/or the like), and/or a structural housing of an electronic device 700 (e.g., a digital assistant, a multimedia device, a portable audio device, smart home device, and/or the like) encompassing the a first loudspeaker comprising the first loudspeaker motor (e.g., loudspeaker motor 301) and a second loudspeaker comprising the second loudspeaker motor (e.g., loudspeaker motor 303). In various examples, the first loudspeaker motor (e.g., loudspeaker motor 301) and the second loudspeaker motor (e.g., loudspeaker motor 303) may be coupled together at the coupling area (e.g., coupling area 342) by two or more of a locating pin (e.g., locating pin 340), an adhesive, and/or a structural housing of an electronic device 700.

As described herein, coupling the first loudspeaker motor (e.g., loudspeaker motor 301) to the second loudspeaker motor (e.g., loudspeaker motor 303) may comprise inserting a first portion of a locating pin (e.g., locating pin 340) into the first baseplate (e.g., baseplate 302) of the first loudspeaker motor (e.g., loudspeaker motor 301) at a center point of an outer diameter (e.g., outer diameter 308) of a first centrally located pole piece (e.g., centrally located pole piece 306) of the first loudspeaker motor, and inserting a second portion of the locating pin into the second baseplate (e.g., baseplate 350) of the second loudspeaker motor (e.g., loudspeaker motor 301) at a center point of an outer diameter (e.g., outer diameter 356) of a second centrally located pole piece (e.g., centrally located pole piece 354) of the second loudspeaker motor. As such, a first central axis of the first loudspeaker motor (e.g., loudspeaker motor 301) may align with a second central axis of the second loudspeaker motor (e.g., loudspeaker motor 303).

The process 800 may continue at operation 804, at which one or more electric signals is provided to a first voice coil (e.g., voice coil 330) of the first loudspeaker motor (e.g., loudspeaker motor 301) and a second voice coil (e.g., voice coil 378) of the second loudspeaker motor (e.g., loudspeaker motor 303). In various examples, the one or more electric signals may be provided by an electronic device 700 based on various audio data (e.g., audio data 708). The one or more electric signals provided to the first voice coil (e.g., voice coil 330) and the second voice coil (e.g., voice coil 378) may be the same electric signals originating from the same electronic device 700 such that the first voice coil and the second voice device have equal forces (e.g., magnetic forces) applied to them. Alternatively, in some examples, the one or more electric signals provided to the first voice coil (e.g., voice coil 330) and the second voice coil (e.g., voice coil 378) may be different electric signals.

For example, one or more electric signals provided to the first voice coil (e.g., voice coil 330) may be of a first frequency range (e.g., associated with a high frequency range) and/or first amplitude, while one or more electric signals provided to the second voice coil (e.g., voice coil 378) may be of a second frequency range (e.g., associated with a low frequency range) and/or second amplitude. In such examples, the one or more electric signals associated with the first frequency range and the one or more electric signals associated with the second frequency range may be respective portions of a set of common electrical signals, such that the first loudspeaker is utilized to generate audio associated with the first frequency range of the common electrical signals, and the second loudspeaker is utilized to generate audio associated with the second frequency range of the common electrical signals.

By coupling the first loudspeaker motor (e.g., loudspeaker motor 301) and the second loudspeaker motor (e.g., loudspeaker motor 303) by their respective baseplates (e.g., baseplate 302 and baseplate 350), the loudspeakers and corresponding structural components (e.g., loudspeaker chassis, suspension membranes, and loudspeaker cones) associated with the first loudspeaker and the second loudspeaker may be oriented in opposing (e.g., opposite, or near-opposite) directions. Therefore, any sound pressure waves that originate from the first loudspeaker comprising the first loudspeaker motor (e.g., loudspeaker motor 301) and any sound pressure waves that originate from the second loudspeaker comprising the second loudspeaker motor (e.g., loudspeaker motor 303) may be originated and/or transmitted in opposing (e.g., opposite, or near-opposite) directions.

As such, during operation of the coupled loudspeaker motors (e.g., when the one or more electrical signals are provided to the respective loudspeaker motors) the moving components of the respective loudspeakers (e.g., the voice coils, the voice coil formers, the loudspeaker cones, the suspension membranes, and/or the like) will move in opposing (e.g., opposite, or near-opposite) directions. In this way, the vibrations generated by the respective loudspeakers may cancel each other out and thereby prevent unintentional loudspeaker movement and/or electronic device movement resulting from the speaker excursion (e.g., the displacement of the moving components) of the respective loudspeakers.

Furthermore, as described herein, one or more portions of the magnetic flux and/or magnetic flux leakage (e.g., magnetic flux leakage 418) generated by the first loudspeaker motor (e.g., loudspeaker motor 301) and the second loudspeaker motor (e.g., loudspeaker motor 303) may be generated in part based on the one or more electrical signals provided to the first voice coil (e.g., voice coil 330) of the first loudspeaker motor (e.g., loudspeaker motor 301) and to the second voice coil (e.g., voice coil 378) of the second loudspeaker motor (e.g., loudspeaker motor 303).

The process 800 may continue at operation 806, at which a first magnetic flux leakage associated with the second loudspeaker motor (e.g., loudspeaker motor 303) is repelled during operation of the first loudspeaker motor (e.g., loudspeaker motor 301) and the second loudspeaker motor (e.g., loudspeaker motor 303).

As described herein, a first magnet (e.g., magnet 310) of the first loudspeaker motor (e.g., loudspeaker motor 301) may be oriented such that the first baseplate (e.g., baseplate 302) has a first polarity associated with the first magnet (e.g., a polarity associated with a south pole of the magnet 310). As such, based on the first polarity of the first baseplate (e.g., baseplate 302) of the first loudspeaker motor (e.g., loudspeaker motor 301), a first magnetic flux leakage associated with the second baseplate (e.g., baseplate 350) of the second loudspeaker motor (e.g., loudspeaker motor 303) is repelled such that the first magnetic flux leakage is redirected towards the second loudspeaker motor. In some examples, the first magnetic flux leakage is associated with a first magnetic flux generated in part by the one or more electric signals being provided to the second voice coil (e.g., voice coil 378) of the second loudspeaker motor.

As a result of redirecting the first magnetic flux leakage towards the second loudspeaker motor (e.g., loudspeaker motor 303), a first magnetic saturation of the second loudspeaker motor is increased. Increasing the first magnetic saturation of the second loudspeaker motor has numerous effects on the second loudspeaker motor, such as reducing a first inductance of the second voice coil (e.g., voice coil 378) of the second loudspeaker motor, which leads to higher frequency response and increased performance of the second voice coil. Furthermore, as a result of redirecting the first magnetic flux leakage towards the second loudspeaker motor (e.g., loudspeaker motor 303), a first magnetic flux density of the second loudspeaker motor is increased. Increasing the first magnetic flux density of the second loudspeaker motor (e.g., loudspeaker motor 303) has numerous effects on the second loudspeaker motor, such as increasing a first force factor (e.g., a motor strength) of the second loudspeaker motor. Additionally, increasing the first force factor of the second loudspeaker motor provides the benefit of increasing a first SPL of the second loudspeaker.

The process 800 may continue at operation 808, at which a second magnetic flux leakage associated with the first loudspeaker motor (e.g., loudspeaker motor 301) is repelled during operation of the first loudspeaker motor (e.g., loudspeaker motor 301) and the second loudspeaker motor (e.g., loudspeaker motor 303).

As described herein, a second magnet (e.g., magnet 358) of the second loudspeaker motor (e.g., loudspeaker motor 303) may be oriented such that the second baseplate (e.g., baseplate 350) has a second polarity associated with the second magnet (e.g., a polarity associated with a south pole of the magnet 358). As such, based on the second polarity of the second baseplate (e.g., baseplate 350) of the second loudspeaker motor (e.g., loudspeaker motor 303), a second magnetic flux leakage associated with the first baseplate (e.g., baseplate 302) of the first loudspeaker motor (e.g., loudspeaker motor 301) is repelled such that the second magnetic flux leakage is redirected towards the first loudspeaker motor. In some examples, the second magnetic flux leakage is associated with a second magnetic flux generated in part by the one or more electric signals being provided to the first voice coil (e.g., voice coil 330) of the first loudspeaker motor.

As a result of redirecting the second magnetic flux leakage towards the first loudspeaker motor (e.g., loudspeaker motor 301), a second magnetic saturation of the first loudspeaker motor is increased. Increasing the second magnetic saturation of the first loudspeaker motor has numerous effects on the first loudspeaker motor, such as reducing a second inductance of the first voice coil (e.g., voice coil 330) of the first loudspeaker motor, which leads to higher frequency response and increased performance of the first voice coil. Furthermore, as a result of redirecting the second magnetic flux leakage towards the first loudspeaker motor (e.g., loudspeaker motor 301), a second magnetic flux density of the first loudspeaker motor is increased. Increasing the second magnetic flux density of the first loudspeaker motor (e.g., loudspeaker motor 301) has numerous effects on the first loudspeaker motor, such as increasing a second force factor (e.g., a motor strength) of the first loudspeaker motor. Additionally, increasing the second force factor of the first loudspeaker motor provides the benefit of increasing a second SPL of the first loudspeaker.

Various systems and processes described herein may include or be implemented using or in conjunction with or for a device or electronic device (e.g., an electronic device 700). A device or electronic device may be, for example, one or more of a portable audio device, smart home device, digital assistant device, multimedia device, networked device, desktop computer, laptop computer, tablet computer, smartphone, wearable device (e.g., headset, smartwatches, smart glasses, etc.), kiosk, and/or similar electronic devices. As used herein, computing devices such as smartphones, laptop computers, tablet computers, and/or wearable devices may generally be referred to as mobile devices.

As set forth above, certain methods or process blocks may be skipped or omitted in some implementations. Blocks or operations may be added to some implementations. The methods and processes described herein are also not limited to any particular sequence or order, and the blocks or operations relating thereto can be performed in other sequences or orders that are appropriate. For example, described blocks or operations may be performed in an order other than that specifically disclosed, or multiple blocks or operations may be combined in a single block or state. For instance, two or more blocks or operations may be executed concurrently or with partial concurrence. The example blocks or operations may be performed in serial, in parallel, or in some other manner. For example, the order of execution of two or more blocks or operations may be scrambled relative to the order described. For instance, two or more blocks or operations may be executed concurrently or with partial concurrence. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, “can,” “could,” “might,” or “may,” unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. An apparatus, comprising:
- a first loudspeaker comprising:
  - a first loudspeaker motor comprising:
    - a first baseplate, wherein the first baseplate comprises a first centrally located pole piece protruding from a top surface of the first baseplate;
    - a first magnet, wherein a bottom surface of the first magnet is coupled to the top surface of the first baseplate;
    - a second magnet, wherein the second magnet is coupled to a distal end of the first centrally located pole piece; and
- a second loudspeaker comprising:
  - a second loudspeaker motor comprising:
    - a second baseplate, wherein the second baseplate comprises a second centrally located pole piece protruding from a top surface of the second baseplate;

a third magnet, wherein a bottom surface of the third magnet is coupled to the top surface of the second baseplate;

a fourth magnet, wherein the fourth magnet is coupled to a distal end of the second centrally located pole piece, wherein the first baseplate of the first loudspeaker motor is coupled to the second baseplate of the second loudspeaker motor such that an orientation of the first loudspeaker opposes an orientation of the second loudspeaker, wherein the first magnet is oriented such that the first baseplate has a first polarity associated with the first magnet, wherein the third magnet is oriented such that the second baseplate has a second polarity associated with the third magnet, wherein the first polarity is a same polarity as the second polarity, wherein the first polarity of the first baseplate repels a first magnetic flux leakage associated with the second baseplate of the second loudspeaker motor such that the first magnetic flux leakage is redirected towards the second loudspeaker motor, and wherein the second polarity of the second baseplate repels a second magnetic flux leakage associated with the first baseplate of the first loudspeaker motor such that the second magnetic flux leakage is redirected towards the first loudspeaker motor.

2. The apparatus of claim 1, wherein redirection of the first magnetic flux leakage towards the second loudspeaker motor increases a first magnetic flux density of the second loudspeaker motor, and wherein redirection of the second magnetic flux leakage towards the first loudspeaker motor increases a second magnetic flux density of the first loudspeaker motor.

3. The apparatus of claim 1, further comprising one or more of:

a locating pin, an adhesive, or a structural housing of an electronic device encompassing the first loudspeaker and the second loudspeaker, wherein one or more of the locating pin, the adhesive, or the structural housing of the electronic device are configured to couple the first baseplate of the first loudspeaker motor to the second baseplate of the second loudspeaker motor.

4. An apparatus, comprising:

a first loudspeaker comprising a first loudspeaker motor; and a second loudspeaker comprising a second loudspeaker motor, wherein the first loudspeaker motor is coupled to the second loudspeaker motor such that an orientation of a first loudspeaker cone of the first loudspeaker opposes an orientation of a second loudspeaker cone of the second loudspeaker, wherein a first magnet of the first loudspeaker motor is oriented such that a first baseplate of the first loudspeaker motor has a first polarity associated with the first magnet, wherein a second magnet of the second loudspeaker motor is oriented such that a second baseplate of the second loudspeaker motor has a second polarity associated with the second magnet, wherein the first polarity is a same polarity as the second polarity.

5. The apparatus of claim 4, wherein the first polarity of the first baseplate of the first loudspeaker motor repels a first magnetic flux leakage associated with the second baseplate of the second loudspeaker motor during operation of the second loudspeaker motor such that the first magnetic flux leakage is redirected towards the second loudspeaker motor; and wherein the second polarity of the second baseplate of the second loudspeaker motor repels a second magnetic flux leakage associated with the first baseplate of the first loudspeaker motor during operation of the first loudspeaker motor such that the second magnetic flux leakage is redirected towards the first loudspeaker motor.

6. The apparatus of claim 5, further comprising one or more of:

a locating pin, an adhesive, or a structural housing of an electronic device encompassing the first loudspeaker and the second loudspeaker, wherein one or more of the locating pin, the adhesive, or the structural housing of the electronic device are configured to couple the first baseplate of the first loudspeaker motor to the second baseplate of the second loudspeaker motor.

7. The apparatus of claim 6, wherein a first portion of the locating pin is inserted into the first baseplate of the first loudspeaker motor at a center point of a first outer diameter of a first centrally located pole piece of the first loudspeaker motor and a second portion of the locating pin inserted into the second baseplate of the second loudspeaker motor at a center point of a second outer diameter of a second centrally located pole piece of the second loudspeaker motor such that a first central axis of the first loudspeaker motor aligns with a second central axis of the second loudspeaker motor.

8. The apparatus of claim 6, wherein the locating pin is configured as one of a coiled spring pin or a slotted spring pin.

9. The apparatus of claim 6, wherein the locating pin is constructed out of a non-magnetic material.

10. The apparatus of claim 5, wherein redirection of the first magnetic flux leakage by the first polarity of the first baseplate towards the second loudspeaker motor increases a first magnetic saturation of the second loudspeaker motor, wherein increasing the first magnetic saturation reduces a first inductance of a first voice coil of the second loudspeaker motor, and wherein redirection the second magnetic flux leakage by the second polarity of the second baseplate towards the first loudspeaker motor increases a second magnetic saturation of the first loudspeaker motor, wherein increasing the second magnetic saturation reduces a second inductance of a second voice coil of the first loudspeaker motor.

11. The apparatus of claim 5, wherein redirection of the first magnetic flux leakage by the first polarity of the first baseplate towards the second loudspeaker motor increases a first magnetic flux density of the second loudspeaker motor, and wherein redirection of the second magnetic flux leakage by the second polarity of the second baseplate towards the first loudspeaker motor increases a second magnetic flux density of the first loudspeaker motor.

12. The apparatus of claim 11, wherein an increase in the first magnetic flux density of the second loudspeaker motor based on the redirection of the first magnetic flux leakage causes an increase in a first force factor of the second loudspeaker motor, and wherein an increase of the second magnetic flux density of the first loudspeaker motor based on the redirection of the second magnetic flux leakage causes an increase in a second force factor of the first loudspeaker motor.

13. The apparatus of claim 12, wherein an increase in the first force factor of the second loudspeaker motor causes an increase in a first sound pressure level of the second loudspeaker, and wherein an increase in the second force factor of the first loudspeaker motor causes an increase in a second sound pressure level of the first loudspeaker.

14. The apparatus of claim 5, wherein the first baseplate of the first loudspeaker motor and the second baseplate of the second loudspeaker motor are a common baseplate.

15. A method, comprising:

coupling a first loudspeaker comprising a first loudspeaker motor to a second loudspeaker comprising a second loudspeaker motor, wherein coupling the first loudspeaker to the second loudspeaker comprises coupling a first baseplate of the first loudspeaker motor to a second baseplate of the second loudspeaker motor such that an orientation of a first loudspeaker cone of the first loudspeaker opposes an orientation of a second loudspeaker cone of the second loudspeaker, wherein a first magnet of the first loudspeaker motor is oriented such that the first baseplate of the first loudspeaker motor has a first polarity associated with the first magnet, wherein a second magnet of the second loudspeaker motor is oriented such that the second baseplate of the second loudspeaker motor has a second polarity associated with the second magnet, and wherein the first polarity is a same polarity as the second polarity;

providing an electric signal to a first voice coil of the first loudspeaker motor and a second voice coil of the second loudspeaker motor;

repelling, based on the first polarity of the first baseplate of the first loudspeaker motor, a first magnetic flux leakage associated with the second baseplate of the second loudspeaker motor such that the first magnetic flux leakage is redirected towards the second loudspeaker motor, wherein the first magnetic flux leakage is associated with a first magnetic flux generated in part by the electric signal being provided to the second voice coil; and repelling, based on the second polarity of the second baseplate of the second loudspeaker motor, a second magnetic flux leakage associated with the first baseplate of the first loudspeaker motor such that the second magnetic flux leakage is redirected towards the first loudspeaker motor, wherein the second magnetic flux leakage is associated with a second magnetic flux generated in part by the electric signal being provided to the first voice coil.

16. The method of claim 15, wherein the first baseplate of the first loudspeaker motor is coupled to the second baseplate of the second loudspeaker motor via one or more of a locating pin, an adhesive, or a structural housing of an electronic device encompassing the first loudspeaker and the second loudspeaker.

17. The method of claim 16, further comprising:

inserting a first portion of the locating pin into the first baseplate of the first loudspeaker motor at a center point of a first outer diameter of a first centrally located pole piece of the first loudspeaker motor; and inserting a second portion of the locating pin into the second baseplate of the second loudspeaker motor at a center point of a second outer diameter of a second centrally located pole piece of the second loudspeaker motor such that a first central axis of the first loudspeaker motor aligns with a second central axis of the second loudspeaker motor.

18. The method of claim 15, further comprising:

increasing, based on redirecting the first magnetic flux leakage towards the second loudspeaker motor, a first magnetic saturation of the second loudspeaker motor, wherein increasing the first magnetic saturation reduces a first inductance of a first voice coil of the second loudspeaker motor, and increasing, based on redirecting the second magnetic flux leakage towards the first loudspeaker motor, a second magnetic saturation of the first loudspeaker motor, wherein increasing the second magnetic saturation reduces a second inductance of a second voice coil of the first loudspeaker motor.

19. The method of claim 15, further comprising:

increasing, based on redirecting the first magnetic flux leakage towards the second loudspeaker motor, a first magnetic flux density of the second loudspeaker motor; and increasing, based on redirecting the second magnetic flux leakage towards the first loudspeaker motor, a second magnetic flux density of the first loudspeaker motor.

20. The method of claim 19, further comprising:

increasing, based on increasing the first magnetic flux density of the second loudspeaker motor, a first force factor of the second loudspeaker motor;

increasing, based on increasing the second magnetic flux density of the first loudspeaker motor, a second force factor of the first loudspeaker motor;

increasing, based on increasing the first force factor of the second loudspeaker motor, a first sound pressure level of the second loudspeaker; and increasing, based on increasing the second force factor of the first loudspeaker motor, a second sound pressure level of the first loudspeaker.

* * * * *